US009436147B2

(12) United States Patent
Yamazaki

(10) Patent No.: US 9,436,147 B2
(45) Date of Patent: Sep. 6, 2016

(54) CALCULATION METHOD OF TONER CONSUMPTION AMOUNT FOR USE IN IMAGE FORMING APPARATUS

(71) Applicant: CANON KABUSHIKI KAISHA, Tokyo (JP)

(72) Inventor: Hiroyuki Yamazaki, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/608,759

(22) Filed: Jan. 29, 2015

(65) Prior Publication Data

US 2015/0220035 A1 Aug. 6, 2015

(30) Foreign Application Priority Data

Feb. 3, 2014 (JP) ................................. 2014-018831

(51) Int. Cl.
*G03G 15/00* (2006.01)
*G06K 15/00* (2006.01)

(52) U.S. Cl.
CPC ......... *G03G 15/556* (2013.01); *G06K 15/4075* (2013.01)

(58) Field of Classification Search
CPC ........... G03G 15/556; G03G 15/0824; G03G 15/50; G03G 15/5062; G03G 9/0802
USPC ........................... 399/24, 27, 38, 46; 358/1.9
See application file for complete search history.

(56) References Cited

U.S. PATENT DOCUMENTS

| 6,384,935 | B1 | 5/2002 | Yamazaki | |
| 6,810,218 | B1* | 10/2004 | Wong | G03G 15/0849 399/27 |
| 7,116,445 | B2 | 10/2006 | Uchiyama et al. | |
| 7,196,804 | B2 | 3/2007 | Yamazaki et al. | |
| 2004/0042805 | A1* | 3/2004 | Takamatsu | G03G 15/556 399/27 |
| 2007/0058199 | A1* | 3/2007 | Kawano et al. | 358/3.01 |
| 2007/0058996 | A1* | 3/2007 | Sakita et al. | 399/27 |

FOREIGN PATENT DOCUMENTS

| JP | 06-175500 A | 6/1994 |
| JP | 06-242676 A | 9/1994 |
| JP | 2002-139962 A | 5/2002 |
| JP | 2012-048056 A | 3/2012 |
| JP | 2012-053122 A | 3/2012 |
| JP | 2012-133036 A | 7/2012 |
| JP | 2013-020077 A | 1/2013 |

OTHER PUBLICATIONS

European Search Report issued in counterpart European Patent Application No. 15152920.3 mailed Jul. 9, 2015.

* cited by examiner

*Primary Examiner* — Walter L Lindsay, Jr.
*Assistant Examiner* — Jessica L Eley
(74) *Attorney, Agent, or Firm* — Fitzpatrick, Cella, Harper & Scinto

(57) ABSTRACT

An edge counter counts the number of edges satisfying a predetermined condition to provide an edge count. A pixel counter counts the number of pixels satisfying a predetermined condition to provide a pixel count. An image determination unit and a toner amount acquisition unit obtain a toner consumption amount based on the edge count and the pixel count for each area.

20 Claims, 23 Drawing Sheets

FIG. 6A

MATRIX 0

| 32 | 158 | 199 | 213 | 60 | 46 |
|---|---|---|---|---|---|
| 172 | 88 | 102 | 116 | 130 | 185 |
| 227 | 74 | 5 | 19 | 144 | 241 |
| 213 | 60 | 46 | 32 | 158 | 199 |
| 116 | 130 | 185 | 172 | 88 | 102 |
| 19 | 144 | 241 | 227 | 74 | 5 |

MATRIX 1

| 37 | 162 | 204 | 218 | 65 | 51 |
|---|---|---|---|---|---|
| 176 | 93 | 107 | 121 | 134 | 190 |
| 232 | 79 | 9 | 23 | 148 | 246 |
| 218 | 65 | 51 | 37 | 162 | 204 |
| 121 | 134 | 190 | 176 | 93 | 107 |
| 23 | 148 | 246 | 232 | 79 | 9 |

MATRIX 2

| 42 | 167 | 209 | 223 | 70 | 56 |
|---|---|---|---|---|---|
| 181 | 97 | 111 | 125 | 139 | 195 |
| 236 | 83 | 14 | 28 | 153 | 250 |
| 223 | 70 | 56 | 42 | 167 | 209 |
| 125 | 139 | 195 | 181 | 97 | 111 |
| 28 | 153 | 250 | 236 | 83 | 14 |

FIG. 6B

MATRIX 0

| 71 | 194 | 133 | 102 |
|---|---|---|---|
| 163 | 41 | 10 | 224 |
| 133 | 102 | 71 | 194 |
| 10 | 224 | 163 | 41 |

MATRIX 1

| 82 | 204 | 143 | 112 |
|---|---|---|---|
| 173 | 51 | 20 | 235 |
| 143 | 112 | 82 | 204 |
| 20 | 235 | 173 | 51 |

MATRIX 2

| 92 | 214 | 153 | 122 |
|---|---|---|---|
| 184 | 61 | 31 | 245 |
| 153 | 122 | 92 | 214 |
| 31 | 245 | 184 | 61 |

FIG. 26
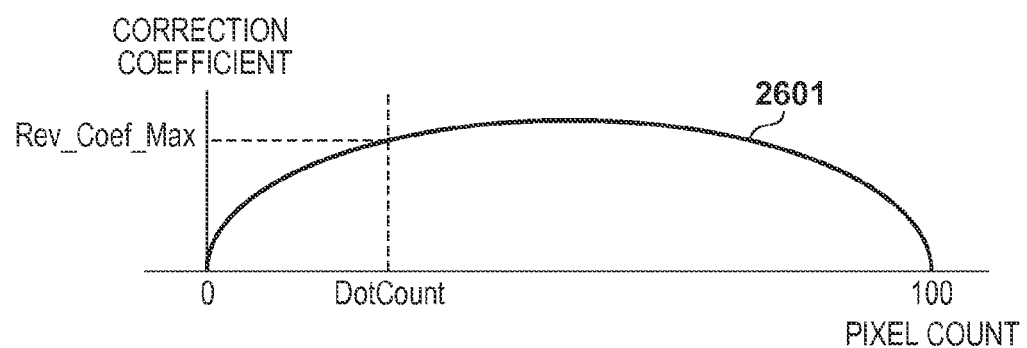
FIG. 27A      FIG. 27B
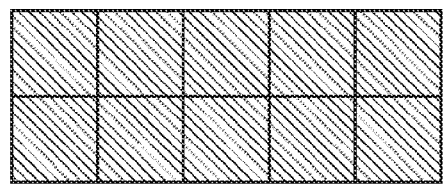     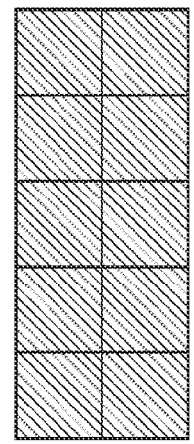
FIG. 27C      FIG. 27D
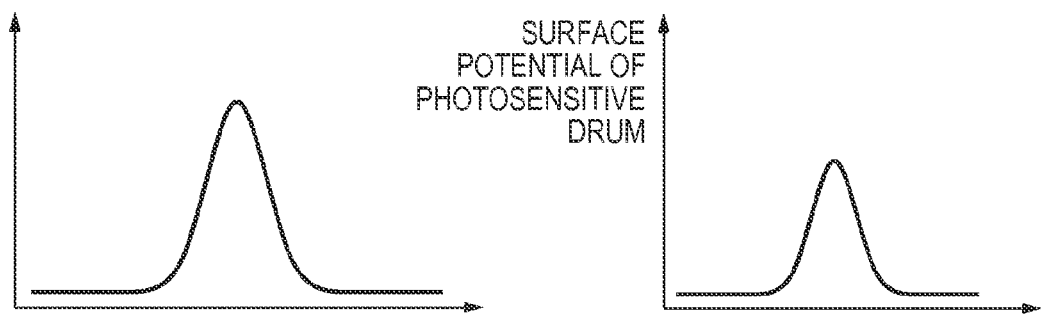

CALCULATION METHOD OF TONER CONSUMPTION AMOUNT FOR USE IN IMAGE FORMING APPARATUS

BACKGROUND OF THE INVENTION

1. Field of the Invention

The present invention relates to an image forming apparatus that forms an image based on an image signal, including, for example, a printer, a copier, a recording device, and a facsimile apparatus, and relates to a calculation method of a toner consumption amount, and a program.

2. Description of the Related Art

A need exists to accurately detect the toner consumption amount of an image forming apparatus, the purpose of which is to notify the user of the remaining amount of toner, the time for cartridge replacement, and the fee, and to control various image forming process conditions and the toner replenishment amount, based on the toner consumption amount. Examples of methods for detecting the toner consumption amount include a method in which a sensor is provided within a cartridge and a method in which the toner consumption amount is estimated from image data. The former method suffers from the problems of manufacturing cost and detection accuracy. Meanwhile, an example of the latter method is the method proposed by Japanese Patent Laid-Open No. 2012-48056. Japanese Patent Laid-Open No. 2012-48056 proposes a method in which the toner consumption amount is calculated based on a weighting according to the number of consecutive pixels consuming toner and the number of intervals with neighboring pixels.

The toner consumption amount varies depending on the type of image (e.g., screen ruling, character, and photograph). FIGS. 18A and 18B show examples of the toner consumption amounts of images that have the same area ratio (pixel count), but are of different types (character and line image, halftone image (screen ruling: 212 lpi, 141 lpi)). Note that a 212-lpi halftone image is an example of an image having a larger value of screen ruling than that of a 141-lpi halftone image. In particular, FIG. 18A shows toner consumption amounts for an area ratio of 25%. The character and line image has the largest toner consumption amount, the 141-lpi halftone image has the second largest toner consumption amount, and the 212-lpi halftone image has the least toner consumption amount. FIG. 18B shows toner consumption amounts for an area ratio of 50%. The toner consumption amounts are in the order reverse to that of the toner consumption amounts for an area ratio of 25%. More specifically, the character and line image has the least toner consumption amount, the 141-lpi halftone image has the second least toner consumption amount, and the 212-lpi halftone image has the largest toner consumption amount. As can be seen from FIGS. 18A and 18B, the toner consumption amount varies depending on the type of image, and the magnitude relationship between the toner consumption amounts changes depending on the area ratio.

The reason that the toner consumption amount varies depending on the type of image, even when the area ratio is the same, is due to the characteristics of electrophotography. The depth and the extent of an electrostatic latent image vary depending on the dot size or the distance from an adjacent dot even when the area ratio is the same, and thus, the developing performance of toner also varies. As a result, the toner consumption amount changes. Therefore, there is a demand for a method for estimating the toner consumption amount that takes into account the difference between toner consumption amounts depending on the type of image.

SUMMARY OF THE INVENTION

The present invention provides a technique for accurately obtaining the toner consumption amount according to the type of image.

The present invention in its first aspect provides an image forming apparatus for creating an image on a recording medium, comprising: a count unit configured to count, among a plurality of pixels in image data for creating the image, the number of pixels whose relationship with an adjacent pixel satisfies a predetermined edge condition to provide an edge count, and to count the number of pixels having a density greater than or equal to a predetermined density to provide a pixel count; and a calculation unit configured to calculate a toner consumption amount based on the edge count and the pixel count.

The present invention in its second aspect provides a calculation method for calculating a consumption amount comprising: counting, among a plurality of pixels in image data, the number of pixels whose relationship with an adjacent pixel satisfies a predetermined edge condition to provide an edge count and counting the number of pixels having a density greater than or equal to a predetermined density to provide a pixel count; and calculating a toner consumption amount based on the edge count and the pixel count.

The present invention in its third aspect provides a non-transitory computer-readable storage medium storing the computer program.

Further features of the present invention will become apparent from the following description of exemplary embodiments (with reference to the attached drawings).

BRIEF DESCRIPTION OF THE DRAWINGS

FIGS. 6A and 6B are diagrams showing examples of a threshold matrix.

FIG. 26 is a diagram showing a correction coefficient table according to Embodiment 3.

FIGS. 27A to 27D are diagrams showing an effect of Embodiment 3.

DESCRIPTION OF THE EMBODIMENTS

Hereinafter, embodiments of the present invention will be described in detail by way of examples with reference to the drawings. Note that constituent elements described in the embodiments are merely examples, and are not intended to limit the scope of the invention. Each of the embodiments of the present invention described below can be implemented solely or as a combination of a plurality of the embodiments or features thereof where necessary or where the combination of elements or features from individual embodiments in a single embodiment is beneficial.

Embodiment 1

Overall Configuration of Image Forming Apparatus

Figure 1:
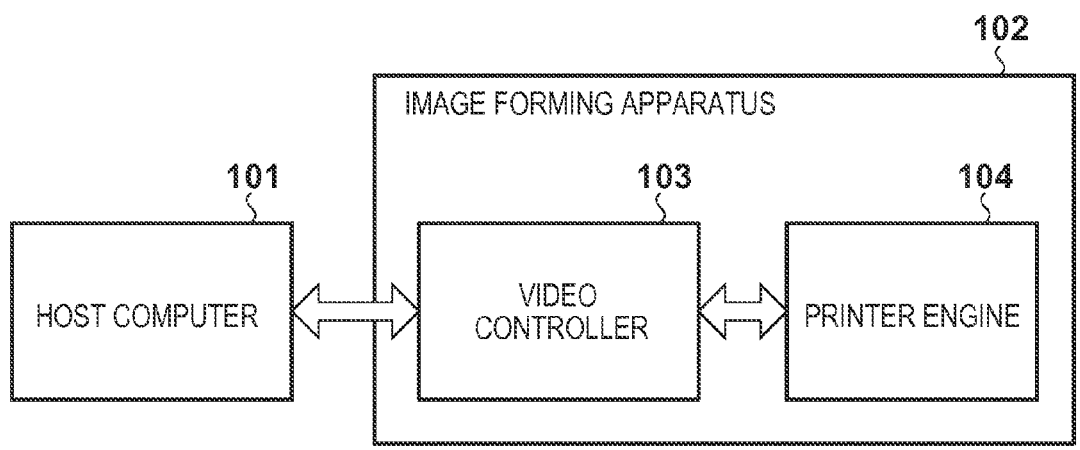
FIG. 1 is a diagram showing an overall configuration of an image forming apparatus.

The configuration of an image forming apparatus 102 will be described with reference to FIG. 1. In the present embodiment, a description is given using an color image forming apparatus that forms an image by using four color materials (color agents) of cyan, magenta, yellow, and black (hereinafter referred to as C, M, Y, and K). In addition, the image forming apparatus of the present embodiment performs printing with a resolution of 600 dpi. The image forming apparatus 102 includes a video controller 103 that performs various controls and data processing and a printer engine 104 that forms a visualized image on a transfer material. The transfer material may also be occasionally called a recording material, a recording medium, paper, sheet, and transfer paper. A host computer 101 and the like are connected to the image forming apparatus 102 via a network, a parallel interface, a serial interface, or the like. The host computer 101 gives an instruction to the image forming apparatus 102 to execute printing. The video controller 103 rasterizes print data transmitted together with the print execution instruction from the host computer 101 into image data, performs data processing, which will be described later, on the image data, and sends the resulting data to the printer engine 104.

Printer Engine Control

Figure 2:
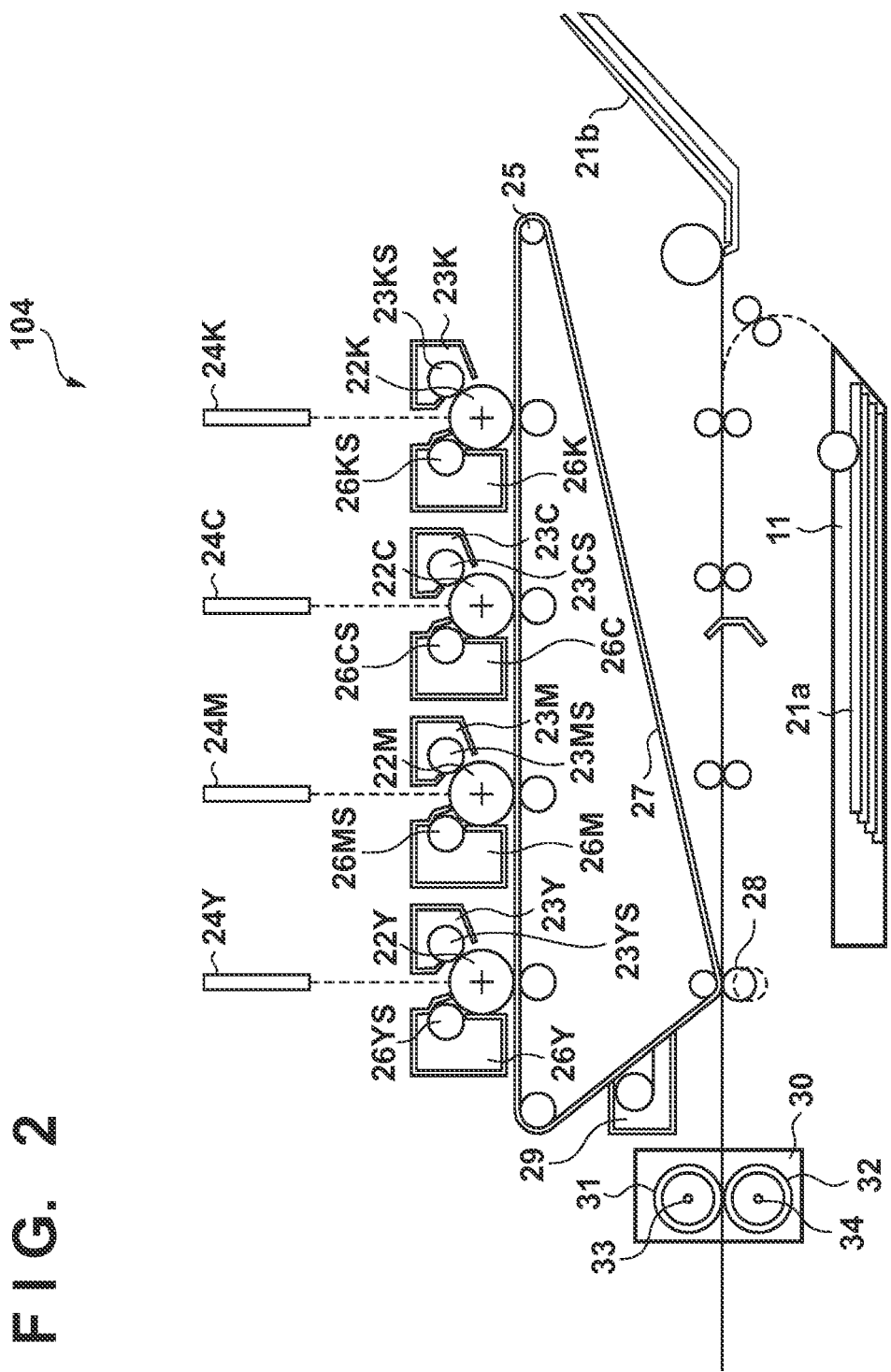
FIG. 2 is a cross-sectional view of the image forming apparatus.
Figure 3:
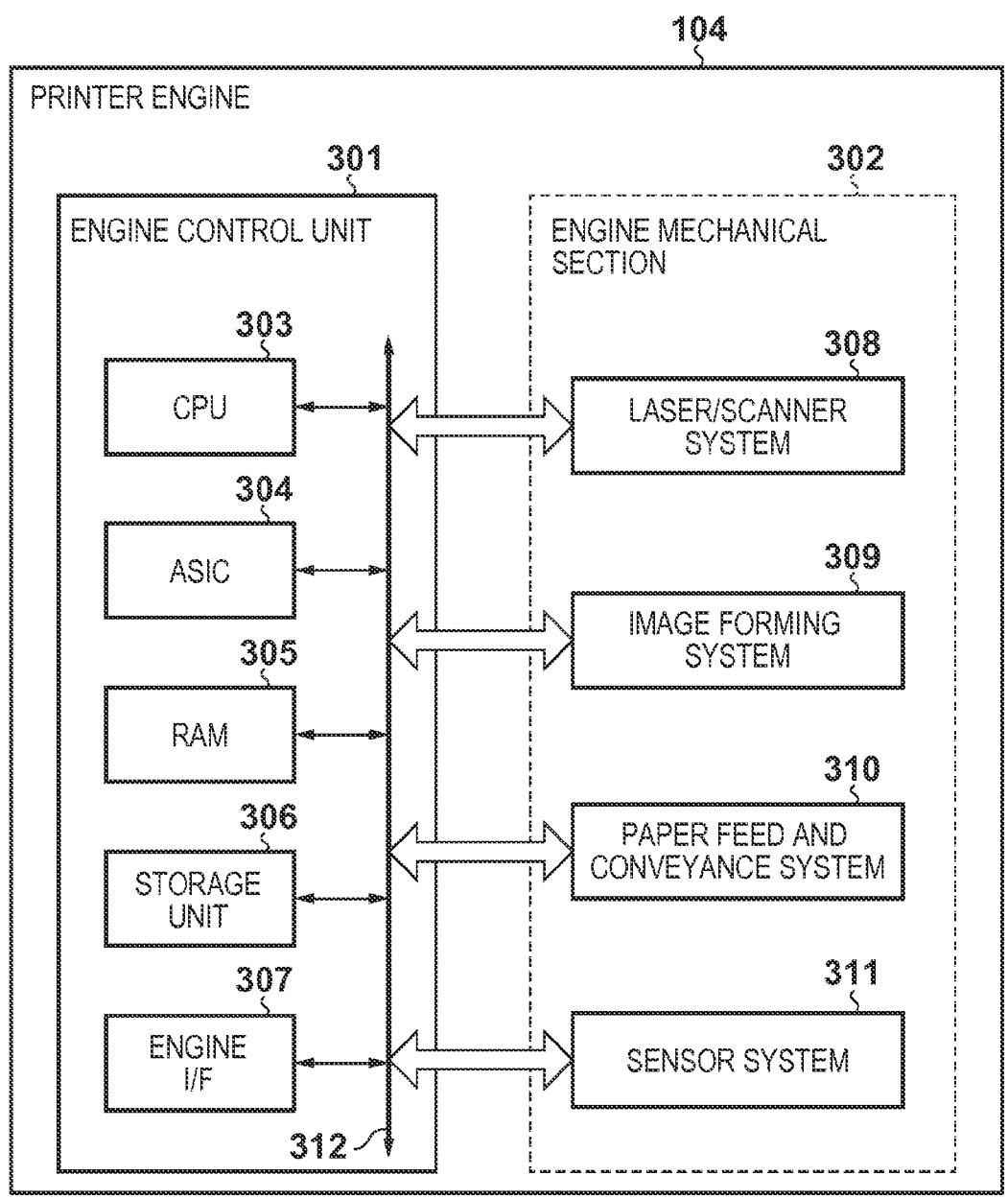
FIG. 3 is a diagram showing the configuration of a printer engine.

The operation of the electrophotographic printer engine 104 that forms a multicolor image by using toners of C, M, Y, and K will be described with reference to FIGS. 2 and 3. Note that the letters YMCK are omitted from the reference numerals when describing aspects that are common to all the four colors. FIG. 2 shows an example of the electrophotographic image forming apparatus 102. The image forming apparatus 102 is a color image forming apparatus of tandem system employing an intermediate transfer member 27. FIG. 3 is a block diagram showing a control unit of the printer engine 104. The printer engine 104 includes an engine control unit 301 and an engine mechanical section 302. The engine mechanical section 302 operates in accordance with various instructions from the engine control unit 301.

A laser/scanner system 308 of the engine mechanical section 302 includes a scanner unit 24 shown in FIG. 2. The scanner unit 24 includes a laser light-emitting element, a laser driver circuit, a scanner motor, a rotating polygon mirror, a scanner driver, and so forth. The scanner unit 24 switches on a laser in accordance with a laser drive signal that indicates a laser exposure time and is sent from the video controller 103, and reflects the laser light by the rotating polygon mirror, thereby performing exposure scanning on a photosensitive drum 22. Exposure light selectively exposes the surface of the photosensitive drum 22, and thereby, an electrostatic latent image is formed.

An image forming system 309 is a portion constituting the main part of the printer engine 104, and develops a latent image formed on the photosensitive drums 22Y, 22M, 22C, and 22K to form a toner image, and transfers and fixes the toner image onto a transfer material. As shown in FIG. 2, the image forming system 309 includes four image formation stations. Each of the stations includes a photosensitive drum 22, a charger 23, and a developing device 26. The image forming system 309 further includes an intermediate transfer member 27, a transfer roller 28, a fixing unit 30, and a high-voltage power supply circuit that generates various biases (high voltages) necessary to perform image formation. Chargers 23Y, 23M, 23C, and 23K include sleeves 23YS, 23MS, 23CS, and 23KS that uniformly charge the surfaces of photosensitive drums 22Y, 22M, 22C, and 22K. Developing devices 26Y, 26M, 26C, and 26K serving as developing units include sleeves 26YS, 26MS, 26CS, and 26KS, respectively, for causing the toner image to adhere to the latent image. The charger 23, the developing device 26, and the photosensitive drum 22 are detachably attached to the body of the image forming apparatus 102 in the form of a process cartridge. The intermediate transfer member 27 is driven by a drive roller 25, and the toner image is primary transferred to the intermediate transfer member 27 from the photosensitive drums 22Y, 22M, 22C, and 22K. As a result of the transfer roller 28 coming into contact with the intermediate transfer member 27, the transfer material 11 is nipped between and transported by the transfer roller 28 and the intermediate transfer member 27, and the multicolor toner image on the intermediate transfer member 27 is secondary transferred to the transfer material 11. The transfer roller 28 is in contact with the transfer material 11 in a period during which the multicolor toner image is transferred onto the transfer material 11, and moves away from the intermediate transfer member 27 upon completion of the transfer. The fixing unit 30 fuses and fixes the multicolor toner image while transporting the transfer material 11. The fixing unit 30 includes a fixing roller 31 that heats the transfer material 11 and a pressure roller 32 that presses the transfer material 11 against the fixing roller 31. The fixing roller 31 and the pressure roller 32 have a hollow shape, and heaters 33 and 34 are set inside the fixing roller 31 and the pressure roller 32, respectively. A cleaning unit 29 cleans the toner remaining on the intermediate transfer member 27. Each of the four process cartridges includes a nonvolatile memory device. A CPU 303 and an ASIC 304 of the engine control unit 301 read and write various types of information (a total number of images formed and the operating time) to and from the memory device.

A paper feed and conveyance system 310 is a portion that governs feed and conveyance of the transfer material 11, and is composed of various conveyance-system motors, a paper feed unit 21 (a paper feed cassette 21a and a paper feed tray 21b), various conveyance rollers including a sheet feed roller and discharge roller, and the like. The paper feed and conveyance system 310 feeds and conveys the transfer material 11 from the paper feed cassette 21a or the paper feed tray 21b according to the operation of the image forming system 309.

A sensor system 311 is a sensor group for collecting information necessary for the CPU 303 and the ASIC 304 to control the laser/scanner system 308, the image forming system 309, and the paper feed and conveyance system 310. This sensor group may include a temperature sensor of the fixing unit 30, a density sensor for detecting the density of a toner image formed on the photosensitive drums 22, the intermediate transfer member 27, or the transfer material 11, a sensor for detecting color shift, a paper size sensor, a sheet leading edge detection sensor, a sheet conveyance detection sensor, and the like. The information detected by the sensor system 311 is acquired by the CPU 303 and is reflected on the control of the print sequence.

The CPU 303 of the engine control unit 301 uses a RAM 305 as a main memory or a work area, and controls the engine mechanical section 302 in accordance with various control programs stored in a non-volatile storage unit 306. A system bus 312 has an address bus and a data bus. Various constituent elements of the engine control unit 301 and the engine mechanical section 302 are connected to the system bus 312 so that they can access each other.

Upon receiving a print execution command from the video controller 103 via an engine interface unit 307, the CPU 303 first drives the image forming system 309 to charge the surface of the photosensitive drum 22 by using the charger 23. The CPU 303 drives the laser/scanner system 308 by generating and outputting a laser drive signal, and forms an electrostatic latent image on the photosensitive drum 22 by using the scanner unit 24.

Next, the CPU 303 drives the image forming system 309 to cause the developing device 26 to develop the electrostatic latent image to form a monochromatic toner image. This monochromatic toner image is successively primary transferred to the intermediate transfer member 27 and the transferred monochromatic toner images are superposed, thus forming a multicolor toner image of Y, M, C, and K on the intermediate transfer member 27. At the same time, the CPU 303 controls the paper feed and conveyance system 310 to feed the transfer material 11 from the paper feed unit 21 by using the sheet feed roller, and to transfer the multicolor toner image onto the transfer material 11. Thereafter, the CPU 303 controls the fixing unit 30 to fix the multicolor toner image on the transfer material 11.

The ASIC 304 performs control of various motors and controls of a high-voltage power supply such as a developing bias in order to execute various print sequences in accordance with an instruction from the CPU 303. The ASIC 304 may be responsible for a part or all of the function of the CPU 303, or the CPU 303 may be responsible for a part or all of the function of the ASIC 304. Alternatively, separate dedicated hardware may be provided to perform a part of the functions of the CPU 303 and the ASIC 304.

Configuration of Video Controller

Figure 4:
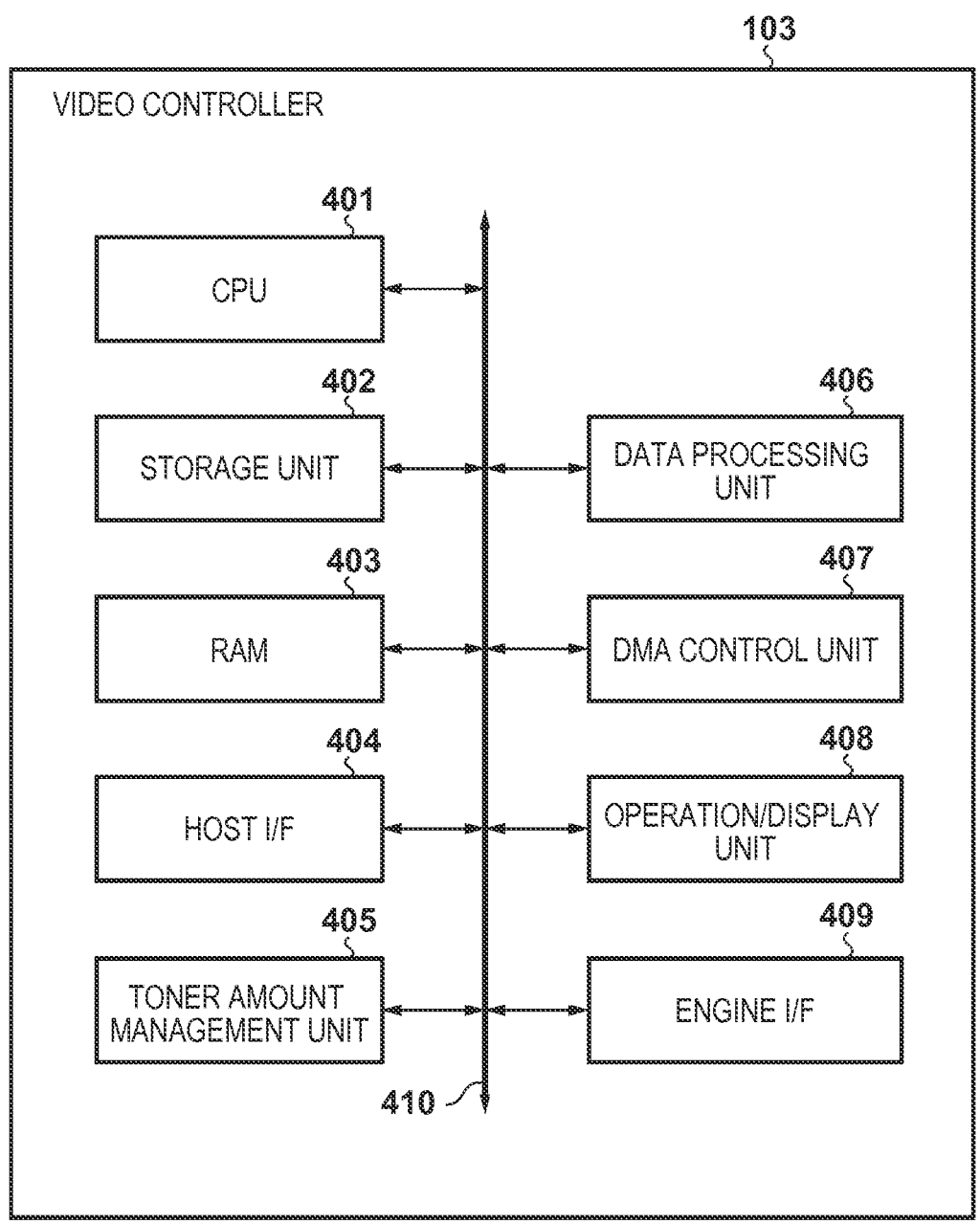
FIG. 4 is a diagram showing the configuration of a video controller.

An exemplary configuration of the video controller 103 will be described with reference to FIG. 4. A CPU 401 governs overall control of the video controller 103. A nonvolatile storage unit 402 stores various control codes executed by the CPU 401 and data used for control. The storage unit 402 may be constituted by, for example, a ROM, an EEPROM, a hard disk, or the like. A RAM 403 is a temporary storage memory that functions as a main memory, a work area, or the like of the CPU 401. A host interface unit 404 receives print data and control data from the host computer 101. The print data received by the host interface unit 404 is stored in the RAM 403. Here, the print data may be bitmap data that has been subjected to halftone processing in the host computer 101 or the like, or may be PDL (page description language) data. PDL data refers to data described in a page description language in order to create page image data. The print data usually contains a rendering command for data on a character, graphics, an image, or the like. A DMA control unit 407 transfers the data in the RAM 403 to an engine interface unit 409 and a data processing unit 406 in accordance with an instruction from the CPU 401. The data processing unit 406 performs various types of data processing (e.g., toner consumption amount estimation) on the image data in the RAM 403, in accordance with an instruction from the CPU 401. The details of the operation of the data processing unit 406 will be described later. An operation/display unit 408 is provided in the body of the image forming apparatus 102, and accepts input of various settings and instructions from the user, and displays various types of information about the image forming apparatus 102. The engine interface unit 409 is a signal input/output unit to and from the printer engine 104. For example, the engine interface unit 409 delivers a laser drive signal output from the data processing unit 406 to the printer engine 104.

A toner amount management unit 405 updates the toner remaining amount in the process cartridge based on the toner consumption amount for each page that is notified from the data processing unit 406, and causes the operation/display unit 408 to display the toner remaining amount. The toner amount management unit 405 may notify the toner remaining amount to the host computer 101 via the host interface unit 404. A system bus 410 has an address bus and a data bus. The above-described various constituent elements are connected to the system bus 410 so that they can access each other. Note that the function of the data processing unit 406 may be implemented as an ASIC (application specific integrated circuit) or dedicated hardware, or the CPU 401 may be responsible for a part or all of the function. Furthermore, an external device such as the host computer 101 may be responsible for a part or all of the function of the video controller 103.

Configuration of Data Processing Unit

Figure 5:
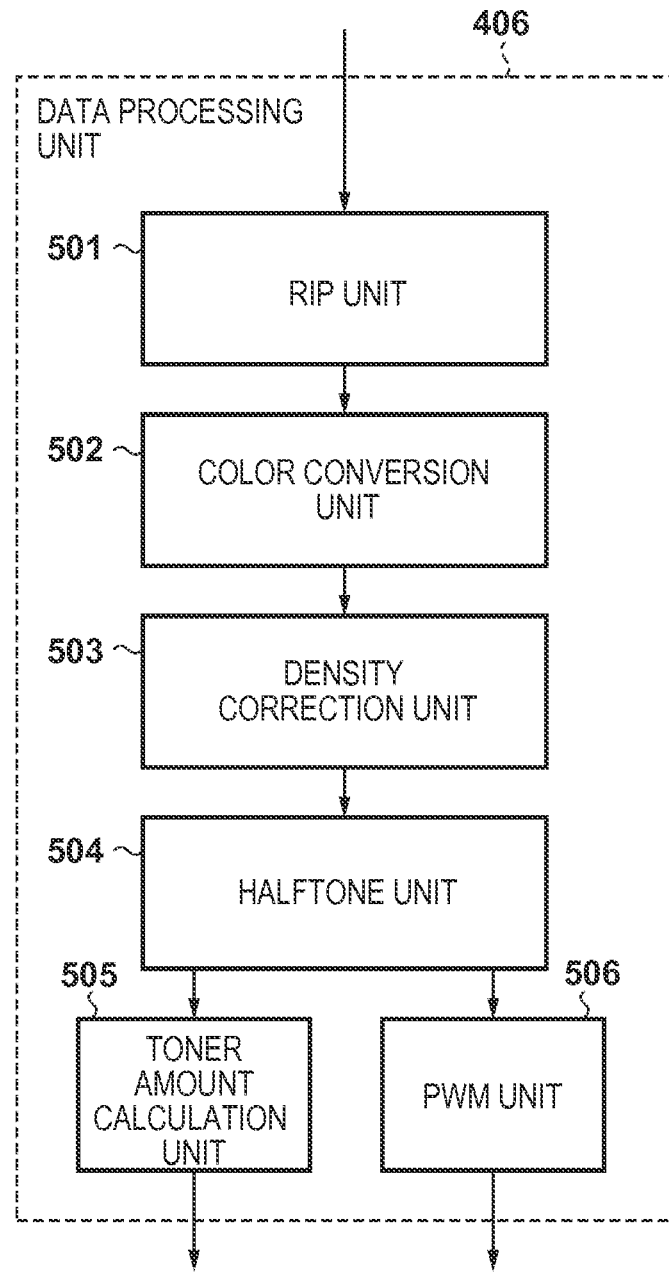
FIG. 5 is a diagram showing the configuration of a data processing unit.

FIG. 5 is a block diagram for illustrating the details of the processing performed by the data processing unit 406. A RIP unit 501 (RIP is an abbreviation of raster image processor/processing) analyzes the content of image data that is stored in the RAM 403 and described in PDL to generate intermediate language data, and also rasterizes the intermediate language data to generate raster image data. The raster image data is written as RGB image data in a predetermined region within the RAM 403. A color conversion unit 502 performs color matching processing in which the RGB image data is converted into a device RGB signal in accordance with the gamut of the image forming apparatus 102. Furthermore, the color conversion unit 502 performs color separation processing in which the device RGB signal is converted into a signal of CMYK, which the colors of the toner color materials of the image forming apparatus 102. Thus, the color conversion unit 502 converts the RGB image data output by the RIP unit 501 into CMYK image data and writes the CMYK image data in a predetermined region within the RAM 403 in a sequential manner. A density correction unit 503 performs conversion on tone values of the CMYK image data output by the color conversion unit 502 by using LUT (lookup table). The purpose of this conversion is to achieve the desired relationship between each of the tone values of the CMYK image data and the density that is output on the transfer material 11 by the printer engine 104. A halftone unit 504 performs halftone processing (e.g., ordered dither) on each image data of CMYK (8 bits) corrected by the density correction unit 503, thereby quantizing the data into 2-bit image data that can be reproduced by the printer engine 104. The 2-bit image data is output to an image memory within the RAM 403. Halftone processing refers to processing in which, for example, input image data is converted into 2-bit image data by using threshold matrices. A threshold matrix is, for example, thresholds of a width of M and a height of N that are arranged in a matrix configuration. For example, the threshold matrices may be constituted by three matrices, namely, matrix 0, matrix 1, and matrix 2. The halftone processing reads out the threshold corresponding to each pixel of the image data from each of the three threshold matrices, compares the pixel value with the three thresholds, and converts the image data into 2 bits by the following processing.

If "pixel value"<"threshold of matrix 0", 0 is output.

If "threshold of matrix 0"≤"pixel value"<"threshold of matrix 1", 1 is output.

If "threshold of matrix 1"≤"pixel value"<"threshold of matrix 2", 2 is output.

If "threshold of matrix 2"≤"pixel value", 3 is output.

In the threshold matrices, a single repetition cycle is composed of M pixels in the horizontal direction and N pixels in the vertical direction of the image data.

FIGS. 6A and 6B show examples of a threshold matrix of K color. K color has two types of threshold matrices shown in FIGS. 6A and 6B. FIG. 6A shows threshold matrices with a screen ruling of 141 lpi. FIG. 6B shows threshold matrices with a screen ruling of 212 lpi.

Figure 7A:
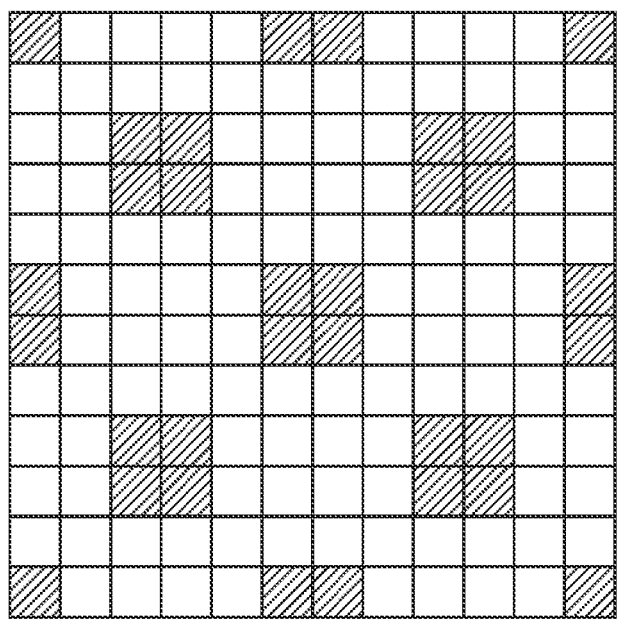
FIGS. 7A and 7B are diagrams showing examples of a halftone-processed image.
Figure 7B:
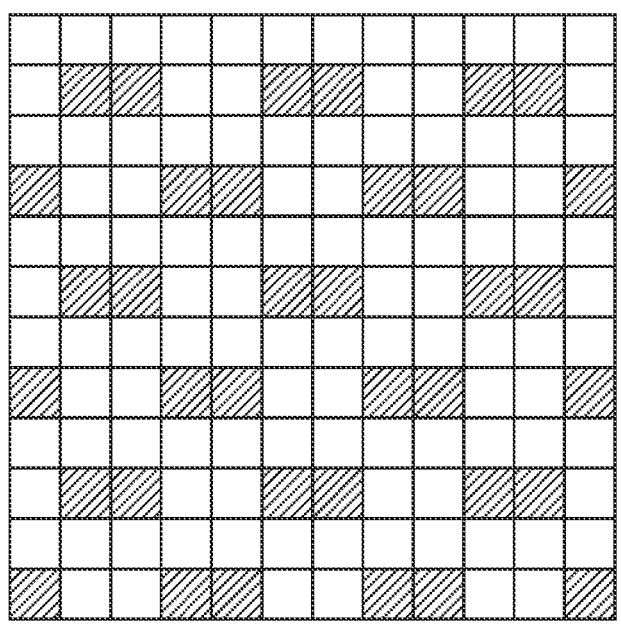

FIG. 7A shows an example of output image data resulting from performing halftone processing on input image data by using the threshold matrices shown in FIG. 6A. FIG. 7B shows an example of output image data resulting from performing halftone processing on input image data by using the threshold matrices shown in FIG. 6B. Which of the matrices shown in FIGS. 6A and 6B is used is determined according to the type of the image to be printed, a user instruction, or the like. The same halftone processing is also performed for CMY.

A PWM unit 506 converts the halftone-processed image within the image memory into a laser drive signal (laser exposure time) by PWM (Pulse Width Modulation) processing. A toner amount calculation unit 505 calculates the toner amount consumed per page based on the halftone-processed image stored for each of colors Y, M, C and K within the image memory. The toner amount calculated by the toner amount calculation unit 505 is notified to the toner amount management unit 405. The detailed operation of the toner amount calculation unit 505 will be described later.

Operation of Video Controller

A description will now be given of an overall flow from the reception of a print command from the host computer 101 to the transmission of data to the printer engine 104. Upon receiving a print command from the host computer 101 via the host interface unit 404, the CPU 401 receives print data via the host interface unit 404, and stores the print data in the RAM 403. Next, the CPU 401 controls the RIP unit 501 of the data processing unit 406 to rasterize the image data in the RAM 403. The CPU 401 further controls the color conversion unit 502 to perform color conversion processing, controls the density correction unit 503 to perform density correction processing, controls the halftone unit 504 to perform halftone processing, and controls the PWM unit 506 to perform PWM processing. In accordance with an instruction from the CPU 401, a laser drive signal generated as a result of the PWM processing is transmitted to the printer engine 104 via the engine interface unit 409. At the same time, the toner amount calculation unit 505 calculates the toner amount in accordance with an instruction from the CPU 401, and notifies the result of calculation to the toner amount management unit 405.

Operation of Toner Amount Calculation Unit

Figure 8:
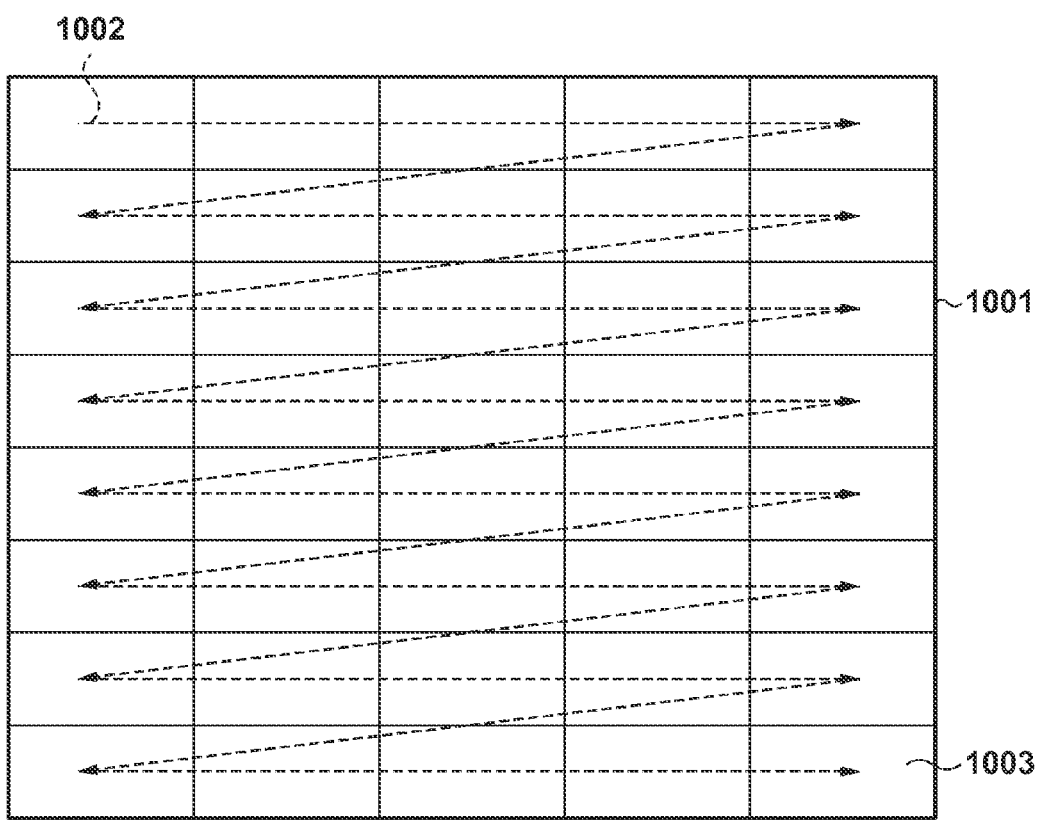
FIG. 8 is a diagram showing window processing.

The detailed operation of the toner amount calculation unit 505 will now be described. While the description is given here, taking K color as an example, the same processing is performed for CMY colors. The toner amount calculation unit 505 logically divides the halftone-processed image data within the image memory into a plurality of areas, calculates the toner amount for each of the areas, and accumulates the toner amounts of all of the areas. Here, a window having a size of 20×5 pixels is used as an area. As shown in FIG. 8, the toner amount calculation unit 505 calculates and accumulates the toner amount for image data 1001 composed of a plurality of pixels while sequentially shifting the windows in the direction of arrows, with a window 1002 at the top left as an origin. The toner amount calculation unit 505 ends the calculation of the toner amount upon reaching a window 1003 at the bottom right.

Figure 9:
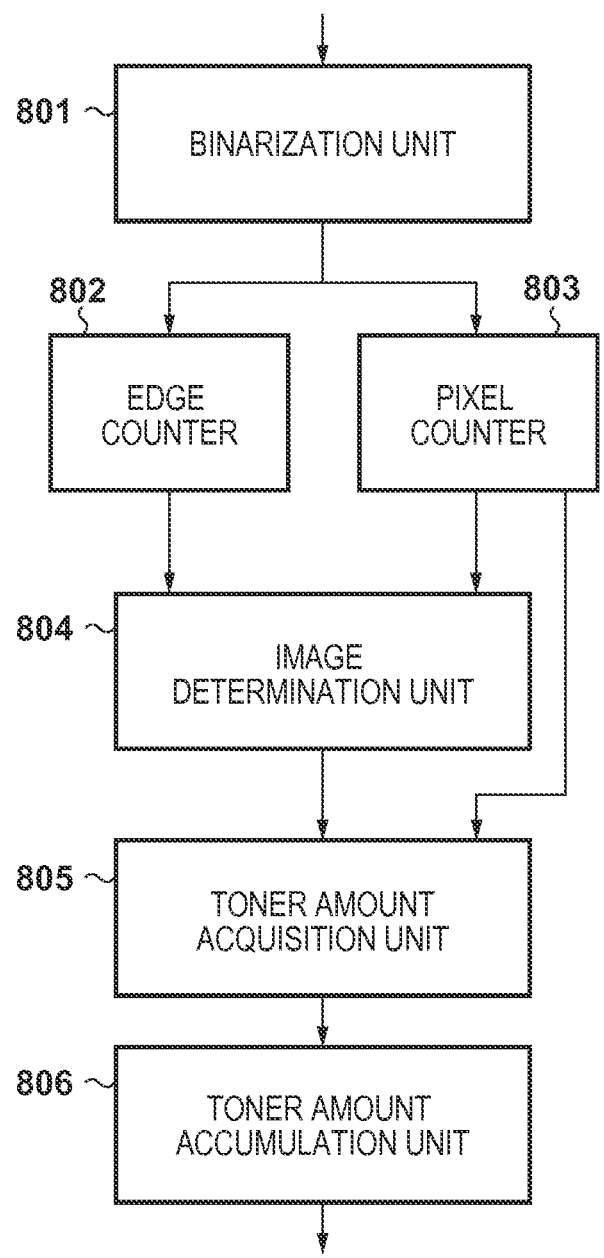
FIG. 9 is a diagram showing the configuration of a toner amount calculation unit.

FIG. 9 shows an exemplary configuration of the toner amount calculation unit 505. A binarization unit 801 binarizes image data for each window. An edge counter 802 counts an edge count that is the number of pixels whose relationship with an adjacent pixel satisfies a predetermined edge condition within each window. A pixel counter 803 counts a pixel count that is the number of pixels having a density greater than or equal to a predetermined density for each window. Note that the edge count and the pixel count are values relating to the toner consumption amount according to the type of image. More specifically, the edge count and the pixel count are parameters that are correlated with a spatial frequency or the depth and the area of an electrostatic latent image of each window. The depth of the latent image indicates a potential deference between a potential of the electrostatic latent image formed by light beam exposure and a potential of a surface area of the photosensitive drum which is not exposed. That is, the depth relates to an amount of toner forming a toner image by developing. As the depth is deeper, the amount of toner is more. Accordingly, the edge count and the pixel count are parameters that can be used to estimate the toner consumption amount. An image determination unit 804 determines the type of the image of each window from the edge count and the pixel count. A toner amount acquisition unit 805 calculates the toner amount according to the type of the image for each window. A toner amount accumulation unit 806 accumulates the toner amount of each window.

Figure 10:
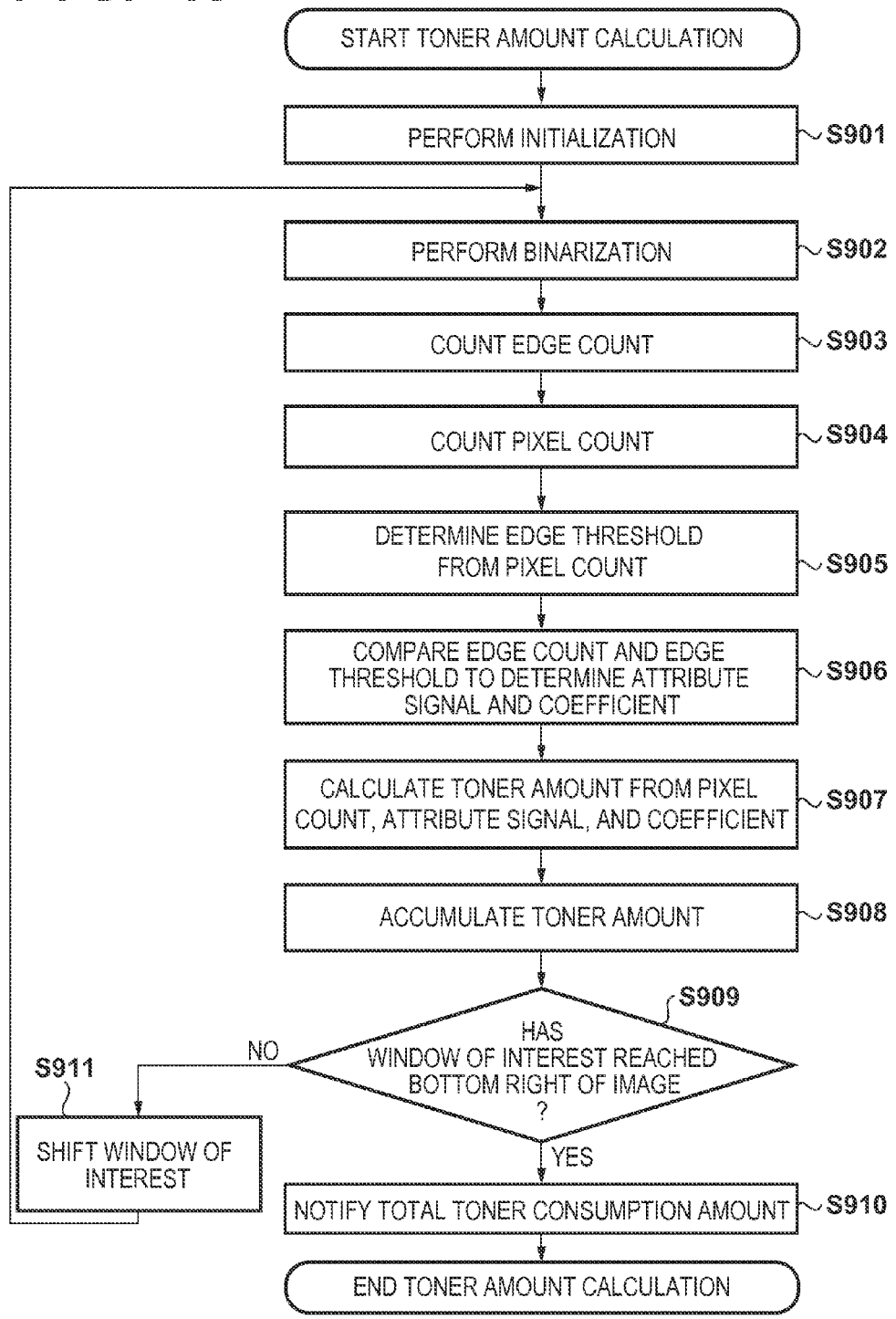
FIG. 10 is a flowchart illustrating a flow of processing performed by a toner amount calculation unit according to Embodiment 1.

The flow of processing performed by the toner amount calculation unit 505 will now be described with reference to the flowchart shown in FIG. 10. At S901, the toner amount accumulation unit 806 performs initialization processing. For example, the toner amount accumulation unit 806 initializes Total_value, which is a variable for holding the total toner amount within one page, to 0, and sets the window at the top left of the image as a window of interest. At S902, the binarization unit 801 converts the image data (pixel value) within the window of interest into binary data. For example, if the input image data is 0 or 1, it is converted into 0. If the input image data is 2 or 3, it is converted into 1.

Figure 11:
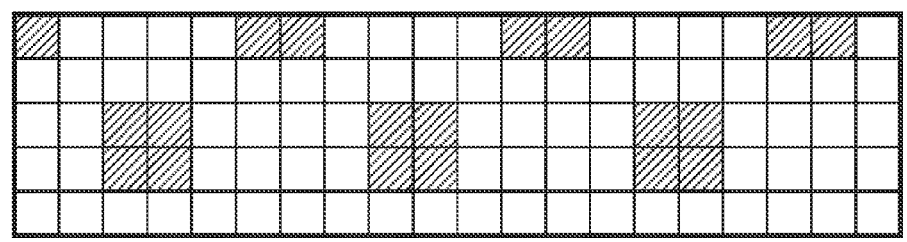
FIG. 11 is a diagram showing window processing.

At S903, the edge counter 802 counts the edge count for the binarized image data. The edge counter 802 initializes EdgeCount, which is a variable for counting the edge count, to 0, and also performs the following processing while sequentially moving the pixel of interest from the pixel at the top left to the pixel at the bottom right within the window. The edge condition refers to the fact that the pixel value of the pixel of interest and the pixel value of the pixel (right pixel) located to the right of the pixel of interest are different, or that the pixel value of the pixel of interest and the pixel value of the pixel (lower pixel) located below the pixel of interest are different. If the edge condition is satisfied, the pixel of interest is an edge. Accordingly, the edge counter 802 increases the value of the edge count EdgeCount by a difference between the pixel values. FIG. 11 shows an example in which the windows are applied to image data. The edge count EdgeCount for the windows shown in FIG. 11 is 38.

At S904, the pixel counter 803 counts DotCount, which is the number of pixels having a pixel value of 1 for the binarized image data. In this case, the predetermined density is a threshold, which may be considered to be 0.5. The pixel count DotCount for the windows shown in FIG. 11 is 19. Note that the pixel count may also be called the dot count. The edge count EdgeCount calculated by the edge counter 802 and the pixel count DotCount calculated by the pixel counter 803 are input to the image determination unit 804.

Figure 12:
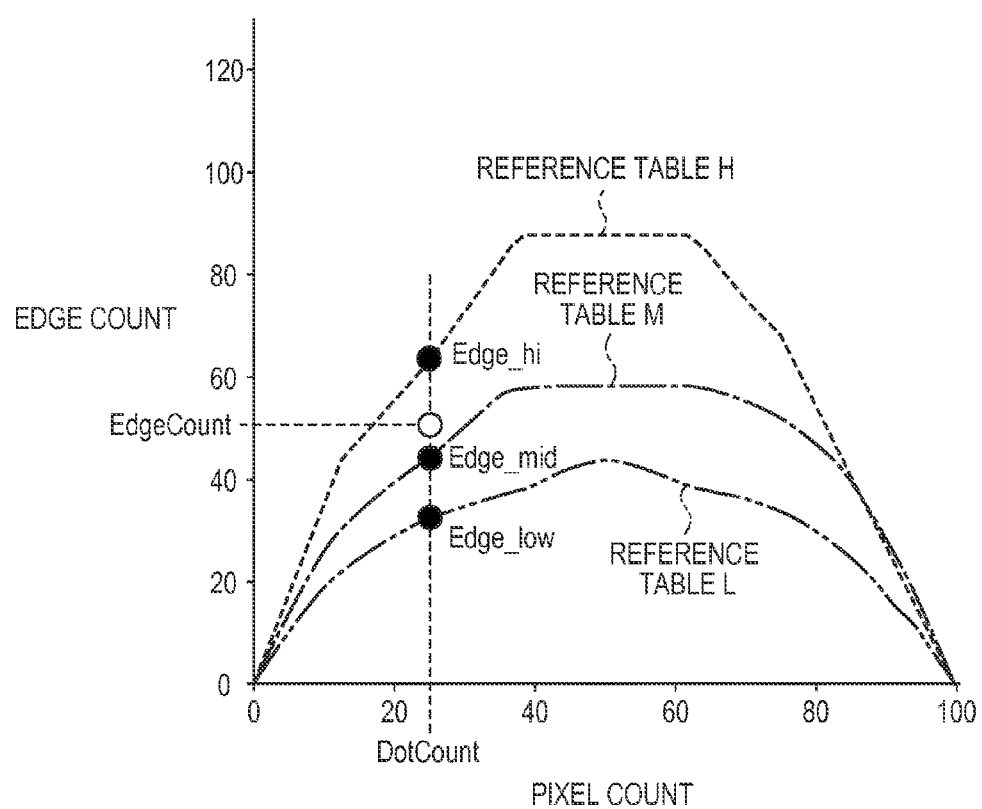
FIG. 12 is a diagram showing examples of a reference table according to Embodiments 1 and 3.

The image determination unit 804 includes a plurality of reference tables (reference table H, reference table M, reference table L) as shown in FIG. 12. The input of each reference table is a pixel count, and the output thereof is an edge threshold. That is, by inputting a pixel count to the reference table, the edge threshold corresponding to the pixel count is output. The method for generating the reference tables will be described later.

At S905, the image determination unit 804 acquires the edge threshold corresponding to DotCount from the reference tables. Here, the edge threshold acquired from the reference table H is referred to as Edge_hi, the edge threshold acquired from the reference table M is referred to as Edge_mid, and the edge threshold acquired from the reference table L is referred to as Edge_low. They are used as thresholds for comparison with the edge count EdgeCount, and also used for calculating a coefficient $\rho$. At S906, the image determination unit 804 compares EdgeCount with Edge_hi, Edge_mid, and Edge_low, and outputs an attribute signal and a coefficient, which are the results of comparison.

Figure 13:
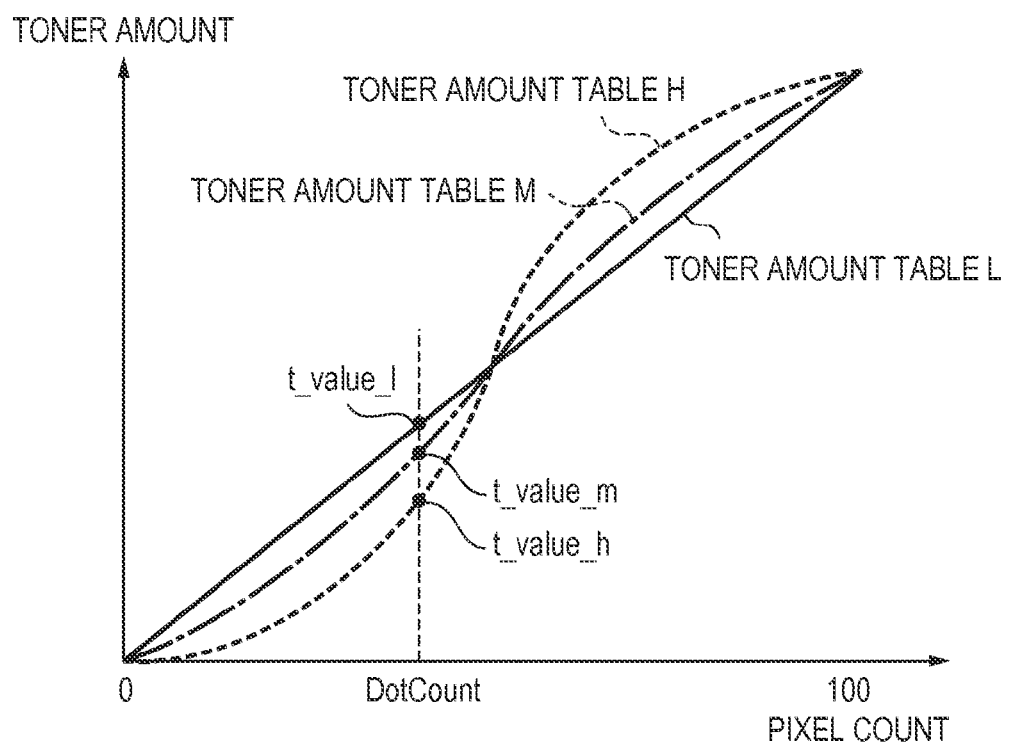
FIG. 13 is a diagram showing examples a toner amount table according to Embodiments 1 and 3.

If Edge_hi≤EdgeCount, the attribute signal is P_H
If Edge_mid≤EdgeCount<Edge_hi, the attribute signal is P_M, and the coefficient $\rho$=(EdgeCount−Edge_mid)/(Edge_hi−Edge_mid)
If Edge_low≤EdgeCount<Edge_mid, the attribute signal is P_M, and the coefficient $\rho$=(EdgeCount−Edge_mid)/(Edge_mid−Edge_low)
If EdgeCount<Edge_low, the attribute signal is P_L The toner amount acquisition unit 805 includes a plurality of toner amount tables (toner amount table H, toner amount table M, toner amount table L) as shown in FIG. 13. The input of each toner amount table is a pixel count, and the output thereof is a toner amount. The method for generating the toner amount tables will be described later. The pixel count DotCount calculated by the pixel counter 803 and the attribute signal and the coefficient $\rho$, which are the output results of the image determination unit 804, are input to the toner amount acquisition unit 805.

At S907, the toner amount acquisition unit 805 calculates the toner amount by referring to the attribute signal and the coefficient $\rho$.

If the attribute signal is P_H, the toner amount acquisition unit 805 obtains the toner amount t_value_h of the toner amount table H corresponding to DotCount, and sets t_value_h as the toner amount toner_value.

If the attribute signal is P_M, the toner amount acquisition unit 805 obtains the toner amount toner_value in the following manner by using the coefficient $\rho$.

For 0≤$\rho$:
The toner amount acquisition unit 805 obtains the toner amount toner_value from toner amounts t_value_h and t_value_m of the toner amount table H and the toner amount table M corresponding to DotCount.

$$\text{toner\_value}=\rho \times t\_value\_h + (1-\rho) \times t\_value\_m$$

For $\rho$<0:
The toner amount acquisition unit 805 obtains the toner amount toner_value from the toner amounts t_value_m and t_value_l of the toner amount table M and the toner amount table L corresponding to DotCount.

$$\text{toner\_value}=(1+\rho) \times t\_value\_m - \rho \times t\_value\_l$$

If the attribute signal is P_L, the toner amount acquisition unit 805 obtains the toner amount t_value_l of the toner amount table L corresponding to DotCount, and sets the toner amount t_value_l as the toner amount toner_value.

As described thus far, if the attribute signal is P_M, the toner amount acquisition unit 805 obtains the toner amount by interpolating t_value_h, t_value_m, t_value_l by using the coefficient $\rho$ as a weight coefficient.

At S908, the toner amount accumulation unit 806 adds the toner amount toner_value obtained by the toner amount acquisition unit 805 to the total toner amount Total_value, and ends the processing for the window of interest. The toner amount calculation unit 505 determines whether the window of interest has reached the bottom right of the image. If the window of interest has not reached the bottom right, the procedure proceeds to S911. At S911, the toner amount calculation unit 505 shifts the window of interest to the next window, and transitions to step S902 again. On the other hand, if the window of interest has reached the bottom right of the image at step S909, the procedure proceeds to S910, at which the toner amount accumulation unit 806 notifies the total toner amount Total_value to the toner amount management unit 405.

Method for Generating Reference Tables H, M, and L

Here, the method for generating the reference tables H, M, and L will now be described. The reference table H is generated by the following method. The following steps 1 to 3 are performed on tone values A=0, 32, 64, 96, 128, 160, 192, 224, and 255.

Step 1: Image data resulting from performing 212-lpi halftone processing on image data having a tone value A is generated. The image data is generated in a size of about 100 pixels or more in both the vertical and horizontal directions.

Step 2: The halftone-processed image data obtained in step 1 is binarized.

Step 3: The pixel count and the edge count for each window are calculated for the binarized image data obtained in step 2, and an average value of all of the windows is determined. The window size is 20 pixels in the horizontal direction and 5 pixels in the vertical direction. That is, the window size used to estimate the toner amount and the window size used to determine the reference table are basically the same.

By interpolating the relationship between the average value of the pixel counts and the average value of the edge counts obtained for each tone value, the table for a pixel count of 0 to 100 is generated. This serves as the reference table H. Examples of the interpolation method include bicubic interpolation, but other interpolation processing may be adopted.

The reference table M and the reference table L are created in the same manner as described above by using 141-lpi halftone processing and 106-lpi halftone processing, respectively. As 212-lpi halftone processing and 141-lpi halftone processing, the same processing used in the halftone unit 504 can be used. As the 106-lpi halftone processing, any matrix capable of achieving an equivalent screen ruling can be used.

Method for Generating Toner Amount Tables H, M, and L

Next is a description of the method for generating the toner amount tables H, M, and L. The toner amount table H is generated by the following method. The following steps 1 to 5 are performed for tone value A=32, 64, 96, 128, 160, 192, 224, and 255.

Step 1: Image data resulting from performing 212-lpi halftone processing for image data having a tone value A is generated. Both of the vertical and horizontal sizes of the image data are about 100 pixels or more.

Step 2: The halftone-processed image obtained in step 1 is binarized to obtain a dot area ratio (%), and the pixel count per window is obtained by multiplying the area ratio by the window area (e.g., 100).

Step 3: The halftone-processed image obtained in step 2 is printed by the printer engine 104, and the toner amount consumed is measured. For example, the toner amount can be measured by measuring the weight of the process cartridge before and after printing, and calculating the difference.

Step 4: The toner amount per window is obtained from the measured toner amount obtained in step 3. The toner amount per window can be calculated from the following expression.

(Measured toner consumption amount)×100/(image size)

Step 5: The relationship of the toner amount obtained in step 4 with the pixel count obtained in step 2 is interpolated to generate a table for the toner amount for a pixel count of 0 to 100. This serves as the toner amount table H. Examples of the interpolation method include bicubic interpolation, but other interpolation processing may be adopted. Note that the toner amount for a pixel count of 0 is 0.

The reference table M is created in the same manner as described above by using 141-lpi halftone processing. The reference table L is a table of the toner amount for a pixel count of 0 to 100 that is generated by linearly interpolating the toner amount for a pixel count of 100 obtained as described above and the toner amount (=0) for a pixel count of 0.

Effect of the Invention

Figure 14:
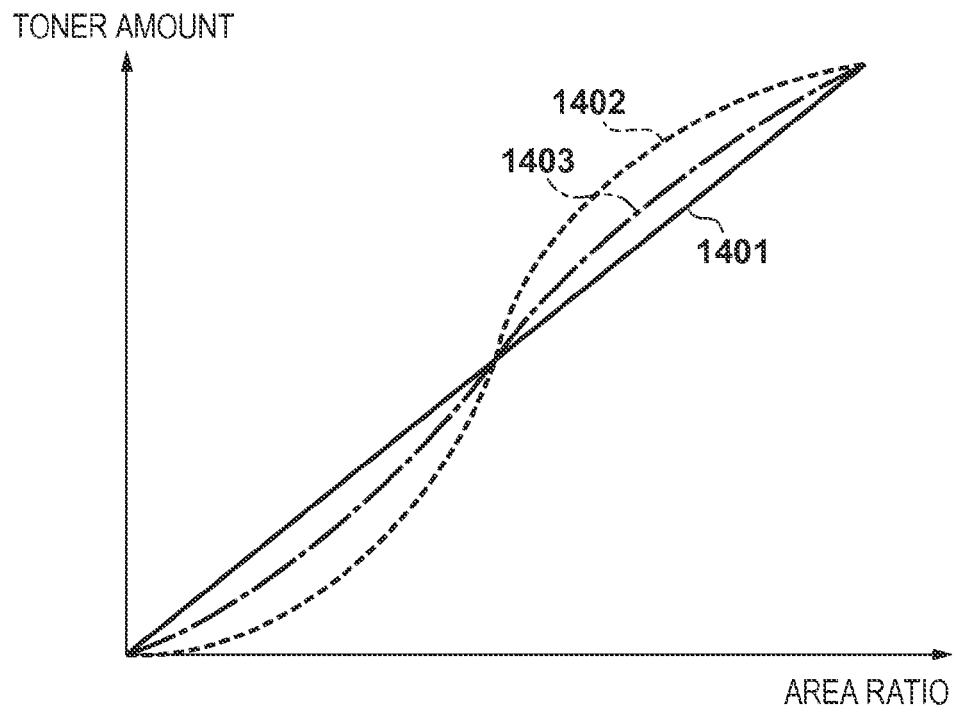
FIG. 14 is a diagram showing an effect of Embodiment 1.

An effect of the present embodiment will now be described. FIG. 14 shows the relationship between the area ratio of the image and the toner consumption amount plotted for each frequency of the image. Numeral 1401 illustrates the relationship between the area ratio and the toner consumption amount for an image with a relatively low spatial frequency, such as a character image. It can be seen that when the spatial frequency is low, the relationship between the area ratio and the toner consumption amount is relatively close to a linear form. Numeral 1402 illustrates the relationship between the area ratio and the toner consumption amount for an image that has been subjected to 212-lpi halftone processing. That is, this image has a relatively high spatial frequency. As compared with the character image, the image that has been subjected to 212-lpi halftone processing has a relatively low toner consumption amount in a highlight region where the area ratio is low, and a relatively high toner consumption amount in a shadow region where the area ratio is high. Numeral 1403 illustrates the relationship between the area ratio and the toner consumption amount for an image that has been subjected to 141-lpi halftone processing. This image has a spatial frequency that is intermediate between the above-described two images. Accordingly, the relationship between the area ratio and the toner consumption amount also has properties intermediate between the above-described two images. As shown by FIG. 14, the relationship between the area ratio and the toner consumption amount changes depending on the spatial frequency of the image.

Figure 15A:
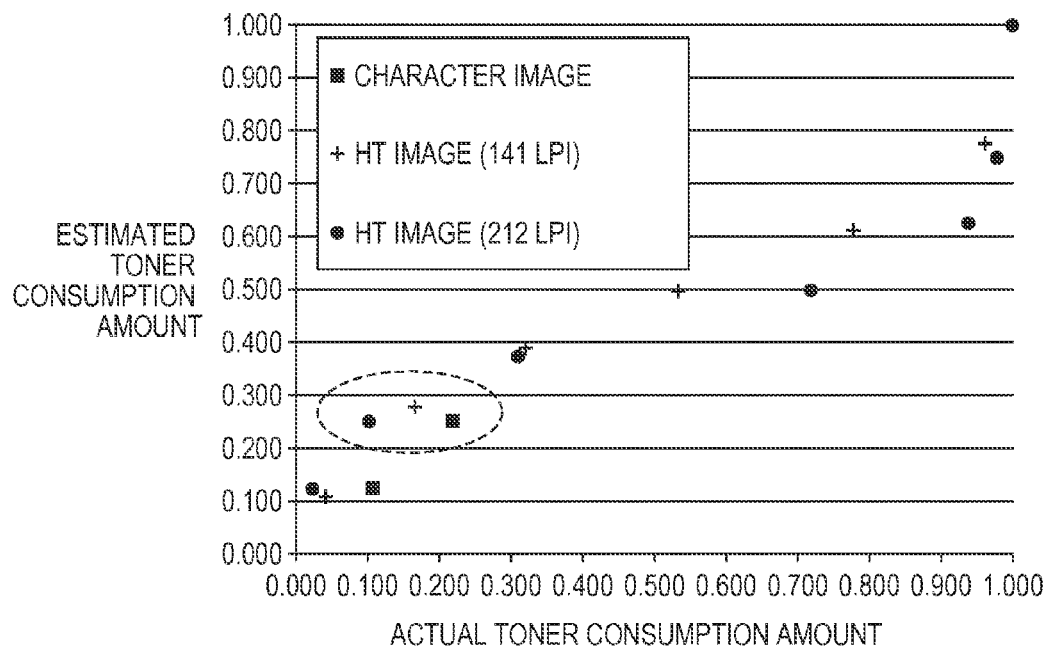
FIGS. 15A and 15B are diagrams showing an effect of Embodiment 1.

FIG. 15A shows the relationship between the actual toner consumption amount and the estimated toner consumption amount for a comparative example. Note that the comparative example adopts a method of estimating the toner consumption amount by using the pixel count only. More specifically, the comparative example adopts a method in which the toner consumption amount is calculated, proportional to the area ratio of the image, with respect to the toner consumption amount of an area ratio of 100% (solid image) as a reference. Here, the toner consumption amount is estimated for a character image and halftone images (212 lpi, 141 lpi) as images of different types (area ratios). As shown by FIG. 15A, the error between the actual toner consumption amount and the estimated toner consumption amount is large. In particular, the actual toner consumption amounts of the three types of images located in region enclosed by the dotted line differ by a factor of up to two, even though they have the same estimated toner consumption amount (=pixel count).

Figure 15B:
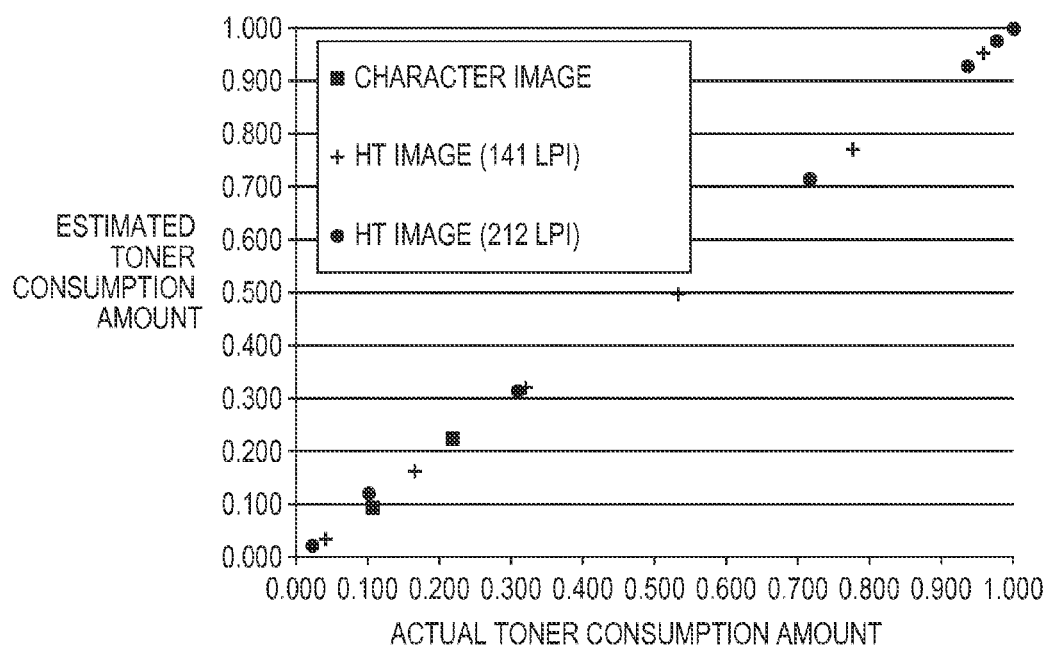

FIG. 15B shows the relationship between the actual toner consumption amount and the estimated toner consumption amount for the present embodiment. It can be seen that in the present embodiment, the error between the actual toner consumption amount and the estimated toner consumption amount is very small. Note that in the present embodiment, the toner consumption amount correlated with the spatial frequency of the image is estimated based on the edge count and the pixel count within a window composed of pixels of 20×5 as described above. As has been already described with reference to FIG. 12, the edge count increases with an increase in the spatial frequency of the image, and the edge count changes depending on the pixel count. In the present embodiment, which makes use of these properties, the toner amount calculation unit 505 estimates the spatial frequency of the image from the relationship between the edge count and the pixel count, and estimates the toner consumption amount according to the estimated spatial frequency and pixel count. Note that the spatial frequency need not be calculated as a numerical value, and the toner consumption amount may be estimated directly from the edge count and the pixel count as described with reference to FIG. 10.

Figure 16A:
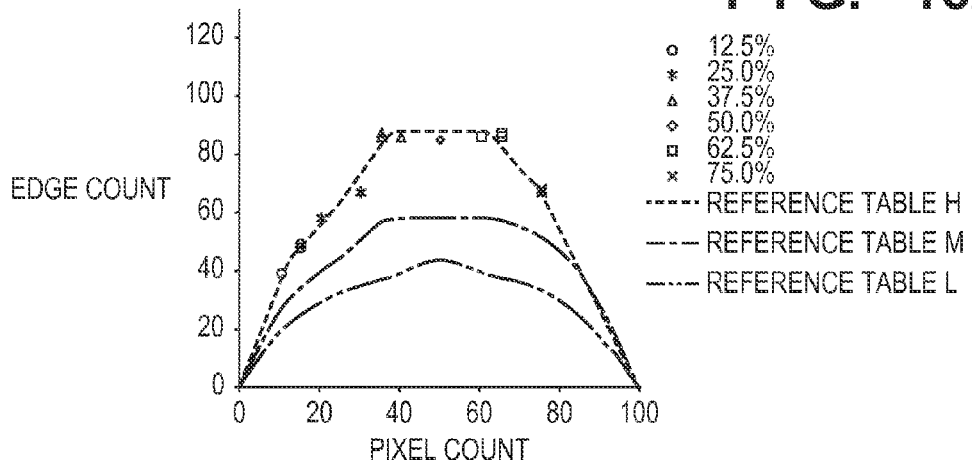
FIGS. 16A to 16C are diagrams showing an effect of Embodiment 1.
Figure 16B:
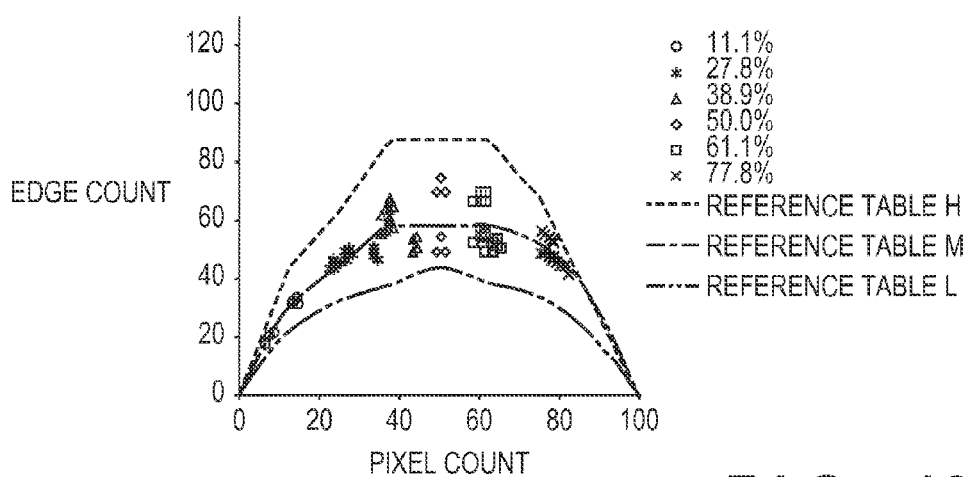
Figure 16C:
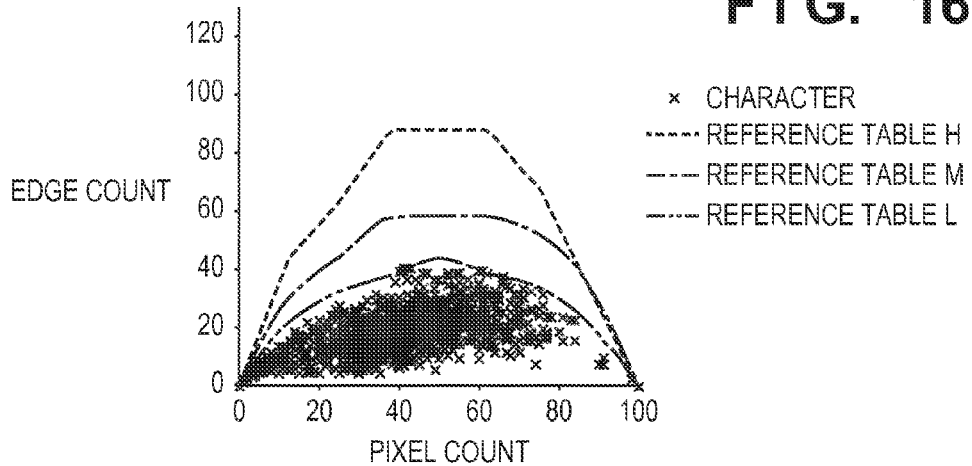
Figure 17:
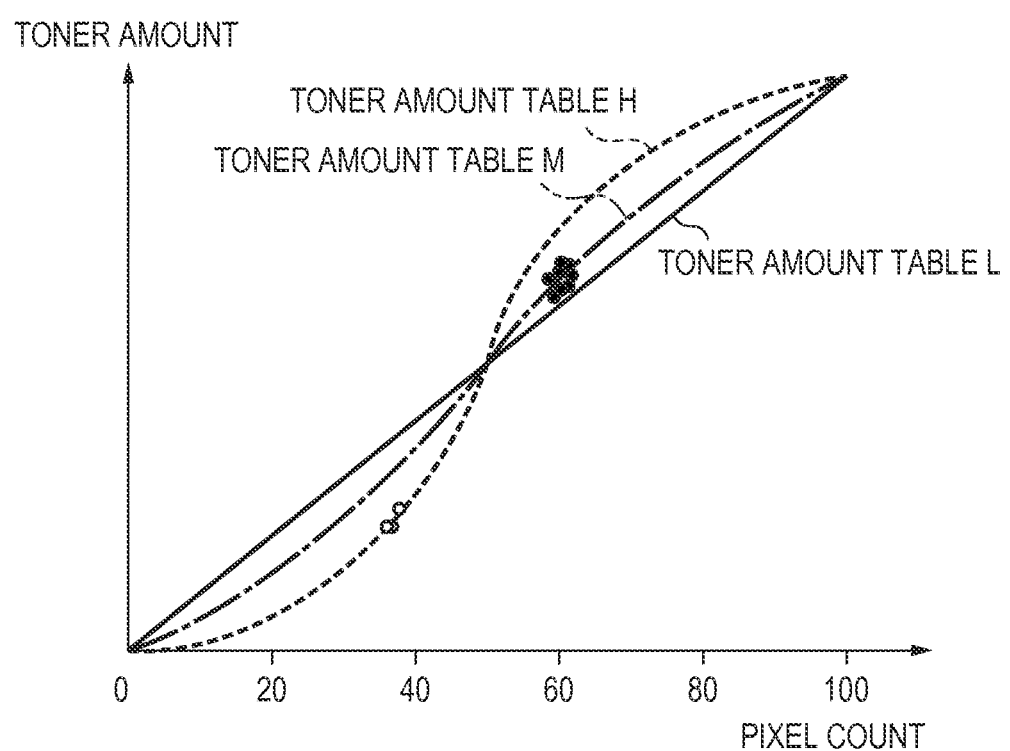
FIG. 17 is a diagram showing an effect of Embodiment 1.
Figure 18A:
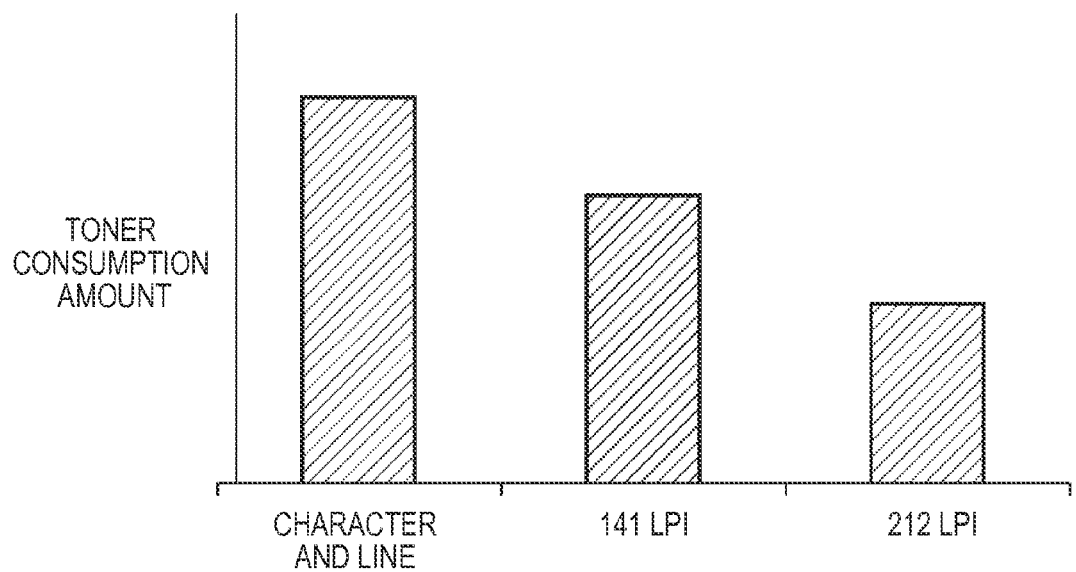
FIGS. 18A and 18B are diagrams showing comparative examples.
Figure 18B:
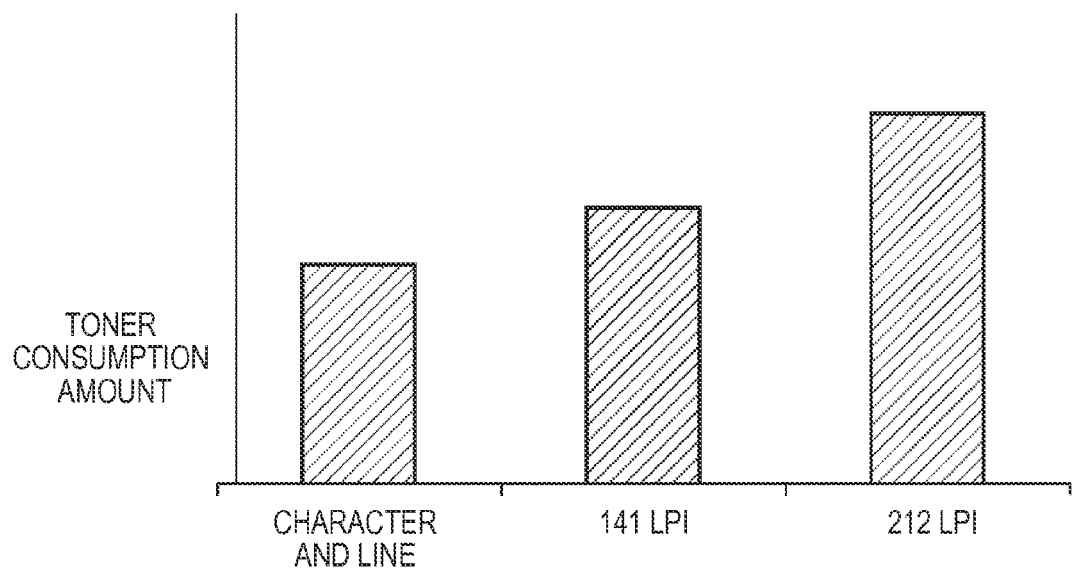

FIGS. 16A, 16B, and 16C show the relationship between the distribution of the pixel count and the edge count and the reference tables H, M, and L for each window in the present embodiment. Since the area of the window is 100 (20 pixels×5 pixels=100 pixels), "pixel count within a window" can be interchangeably called "area ratio (%) within a window". In particular, FIG. 16A shows the distribution of an image obtained by performing 212-lpi halftone processing on an image whose tone value is changed in several steps. For example, the plot for the open triangle (37.5%) shows the distribution of the pixel count and the edge count for each window with respect to the 212-lpi halftone-processed image having an area ratio of 37.5%. Focusing attention on an area ratio of 37.5%, the distribution is present in the vicinity of the reference table H, and the attribute signal of each window that is output by the image determination unit 804 is P_H or P_M. Furthermore, if the attribute signal is P_M, the coefficient $\rho \approx 1$. In addition, the pixel count is distributed in the vicinity of 37.5. With respect to this distribution, the distribution of the toner amount calculated by the toner amount acquisition unit 805 is indicated by the open circle in FIG. 17. As shown by FIG. 17, the toner amount calculated from each window is distributed in the vicinity of t_value_h having a pixel count of 37.5, or in other words, the toner amount per window of the 212-lpi halftone image having an area ratio of 37.5%. Accordingly, the total toner amount Total_value of the image as a whole that has been accumulated by the toner amount accumulation unit 806 is substantially equal to the actual toner consumption amount of the 212-lpi halftone image having an area ratio of 37.5%. The same applies to the other area ratios.

FIG. 16B shows the distribution of an image obtained by performing 141-lpi halftone processing on an image whose tone value is changed in several steps. Focusing attention on an area ratio of 61.1%, the distribution is present between the reference table L and the reference table H with the reference table M at the center, and the attribute signal of each window is P_M. Note that the coefficient $\rho$ is relatively uniformly distributed around 0, and the pixel count is distributed in the vicinity of 61.1. With respect to the distribution, the distribution of the toner amount calculated by the toner amount acquisition unit 805 is shown by the filled circle in FIG. 17. As shown by FIG. 17, the toner amount calculated from each window is distributed in the vicinity of t_value_m having a pixel count of 61.1, or in other words, the toner amount per window of the 141-lpi halftone image having an area ratio of 61.1%. Accordingly, the total toner amount Total_value of the image as a whole that has been accumulated by the toner amount accumulation unit 806 is substantially equal to the toner amount of the 141-lpi halftone image having an area ratio of 61.1%. The same applies to the other area ratios.

FIG. 16C shows the distribution for a character image. In the case of the character image, the pixel count and the edge count are widely distributed depending on the position of the characters within a window. However, as can be seen from FIG. 16C, the edge count is distributed below the reference table L, and the attribute signal of each window is P_L. Accordingly, the toner amount calculated by the toner amount acquisition unit 805 is distributed above the toner amount table L. In other words, the toner amount of each window has a value proportional to the pixel count within the window. As described above, for an image having a low spatial frequency, such as a character image, the relationship between the area ratio (pixel count) and the toner consumption amount is close to a proportional relationship. Accordingly, the accumulated value of the toner consumption amount that has been linearly estimated for each window is substantially equal to the toner consumption amount of the image as a whole. Therefore, the total toner amount Total_value of the image as a whole that has been accumulated by the toner amount accumulation unit 806 is substantially equal to the actual toner amount for the character image.

As described with reference to FIG. 15B, the toner consumption amount estimated by the method according to the present embodiment for the character image and the halftone images (212 lpi, 141 lpi) and the actual toner consumption amount are substantially the same. That is to say, the present embodiment can accurately estimate the toner consumption amount, independently of the type of the image. The inventor has confirmed that the toner consumption amount estimated according to the present embodiment and the actual toner consumption amount are substantially the same for an error diffusion image and a pattern image such as horizontal-line or vertical-line image.

Others

Although a window size has been described as being 20×5 as an example in the present embodiment, the window size is not limited thereto, and may be selected as appropriate. In the description of the present embodiment, the window of interest is shifted so as to prevent a plurality of windows from overlapping. However, a plurality of adjacent windows may overlap each other by shifting the window of interest by one pixel at a time. In this case, however, the toner consumption amount needs to be divided by the number of the pixels that are counted redundantly. In addition, the window of interest may not necessarily be divided, and it is also possible to calculate the toner consumption amount by obtaining the edge count and the pixel count by using one window.

Although the present embodiment has been described taking, as an example, 2-bit halftone processing, it is possible to adopt 1-bit halftone processing or halftone processing of 3 bits or more. An image that has been subjected to halftone processing of 2 bits or more is binarized by the binarization unit 801. In the present embodiment, binarization processing is performed prior to calculation of the toner consumption amount in order to save the memory and simplify the processing. However, binarization need not be performed. In this case, the edge counter 802 counts a difference between the pixel values of the pixel of interest and the adjacent pixel as an edge if the difference is greater than or equal to a predetermined value, and the pixel counter 803 may obtain the pixel count by dividing (a total of the pixel values within the window) by a quantization number.

The present embodiment has adopted an example in which three reference tables and three toner amount tables are used. However, the number of tables may be 2 or 4 or more. Basically, as the number of tables is increased, the estimation accuracy of the toner consumption amount further improves. However, in consideration of the capacity of the memory that stores the tables and the processing load, the number of reference tables and the number of toner amount tables can be each about 3. Although the screen ruling for generating the reference table and the toner amount table has been described as being 212 lpi, 141 lpi, or 106 lpi, any suitable screen ruling may be selected according to the product configuration of the image forming apparatus 102. The reference table and the toner amount table may be generated, for example, from an image that has been subjected to error diffusion processing. In the present embodiment, each of the reference table and the toner amount table has been described as being a one-dimensional table. However, a two-dimensional table in which the reference table and the toner amount table are combined may be used. Specifically, a table that uses the pixel count and the edge count in the form of two-dimensional data as input and uses the toner amount as output may be held, and the toner amount may be obtained directly from the pixel count and the edge count.

Although interpolation calculation is performed if the attribute signal is P_M in the present embodiment, it is possible to adopt the following configuration in which interpolation calculation is not performed. The image determination unit 804 includes two reference tables. The first reference table is a table (reference table A) having a property that is intermediate between the relationship between the pixel count and the edge count for 212 lpi and the relationship between the pixel count and the edge count for 141 lpi. The second table is a table (reference table B) having a property that is intermediate between the relationship between the pixel count and the edge count for 141 lpi and the relationship between the pixel count and the edge count for 106 lpi. The image determination unit 804 uses the pixel count DotCount as input to obtain an edge threshold Edge_a from the reference table A and obtain an edge threshold Edge_b from the reference table B.

If Edge_a≤EdgeCount, the image determination unit 804 outputs the attribute signal P_H If Edge_b≤EdgeCount<Edge_a, the image determination unit 804 outputs the attribute signal P_M If EdgeCount<Edge_b, the image determination unit 804 outputs the attribute signal P_L If the attribute signal received from the image determination unit 804 is P_H, the toner amount acquisition unit 805 obtains the toner amount t_value_h corresponding to DotCount from the toner amount table H, and outputs it as the toner amount toner_value. If the attribute signal is P_M, the toner amount acquisition unit 805 obtains the toner amount t_value_m corresponding to DotCount from the toner amount table M, and outputs it as the toner amount toner_value. If the attribute signal is P_L, the toner amount acquisition unit 805 obtains the toner amount t_value_l corresponding to DotCount from the toner amount table L, and outputs it as the toner amount toner_value. With the above-described configuration, it is also possible to effectively implement the present invention.

Although the toner consumption amount is determined directly from the edge count and the pixel count in the above-described embodiment, the edge count and the pixel count may be converted into a spatial frequency or the depth and the area (volume) of a latent image, and this may be converted into a toner consumption amount. In this case, the computational load increases because a parameter indicating the spatial frequency or the depth and the area of the latent image is obtained as an intermediate product. However, the estimation accuracy of the toner consumption amount remains the same as the estimation accuracy in Embodiment 1. Embodiment 1 is advantageous in that two tables are adopted in order to omit the calculation of a parameter indicating the spatial frequency or the depth or area of the latent image, and the toner consumption amount can be estimated directly by the edge count and the pixel count.

Embodiment 2

A description will be given of another embodiment of the present invention. Features common to embodiment 1 will not be described again herein, but combinations of those features and features of embodiment 2 necessary for the functioning of embodiment 2, as would be clear to a person skilled in the art, are considered to be disclosed with reference to embodiment 2 also. The present embodiment reduces the work memory for image data, thus further reducing the cost. Specifically, a line buffer that holds one line worth of image data is provided within the RAM 403. In the present embodiment, the data processing unit 406 performs various types of processing on the data held in the line buffer within the RAM 403, in synchronization with the operation of the printer engine 104, and sequentially updates the data related to the toner consumption amount. In addition, the data processing unit 406 of the present embodiment performs the counting of the edge count and the pixel count in units of areas (regions larger than windows), and calculates the toner consumption amount in units of regions. The basic operation of the image forming apparatus 102 in the present embodiment is the same as that in Embodiment 1. Accordingly, the description of the common elements has been omitted, and only the difference will be described.

Operation of Toner Amount Calculation Unit

Figure 19:
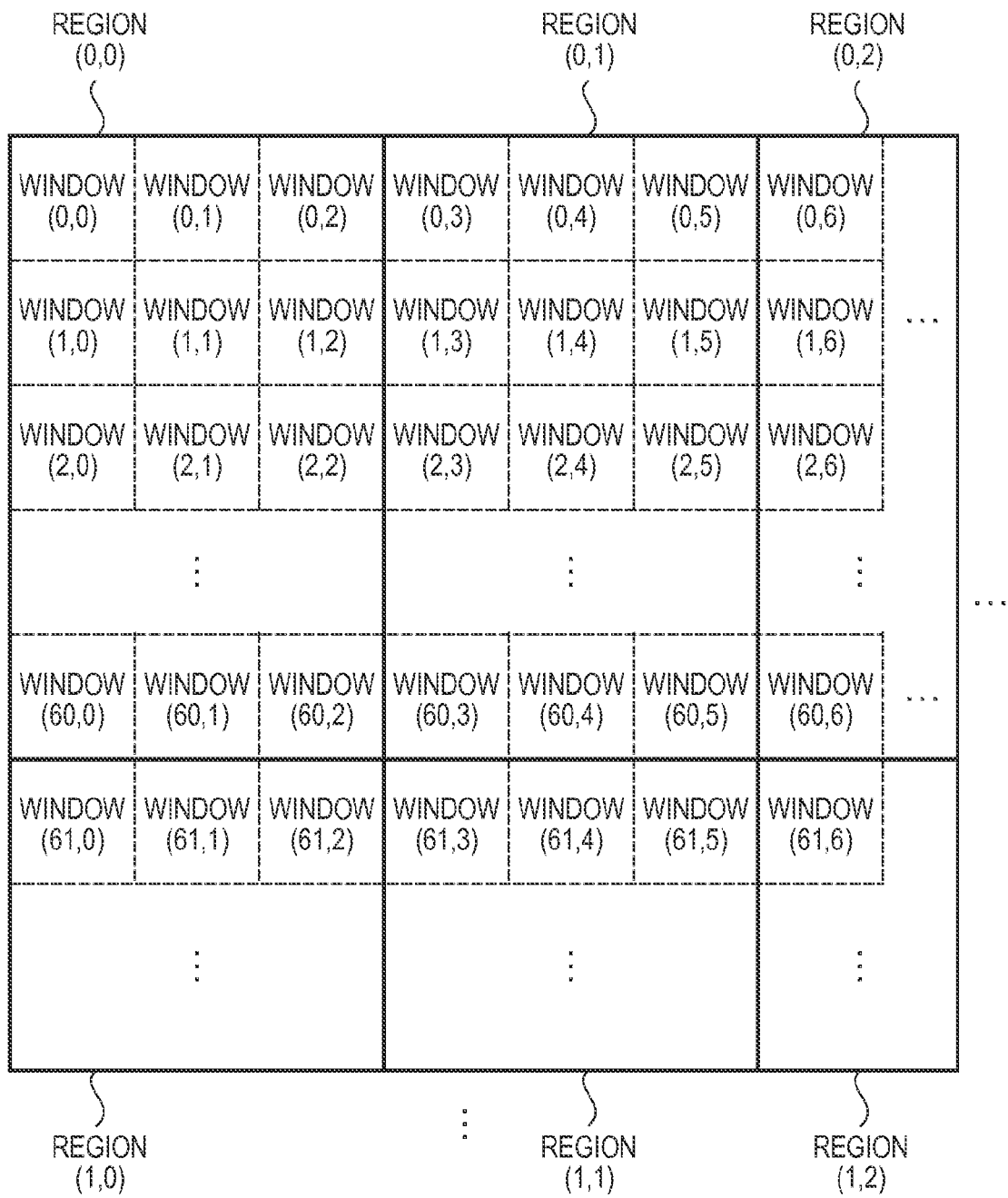
FIG. 19 is a diagram showing windows and regions according to Embodiment 2.

In the present embodiment, the window size is set to 20×1. The reason for this is to make use of the line buffer that holds one line worth of image data. In the present embodiment, 3×60 windows constitute one region. Referring to FIG. 19, one cell enclosed by the dotted line indicates one window, and one cell enclosed by the solid line indicates one region. The numbers for identifying windows within one image are sequentially assigned to the windows from the top left as window numbers (0, 0), (0, 1) . . . as shown in FIG. 19. The numbers for identifying regions within one image are sequentially assigned to the regions from the top left as region numbers (0, 0), (0, 1) . . . as shown in FIG. 19. In addition, in the present embodiment, a region memory that stores the edge count Reg_Edge and the pixel count Reg_Dot for each region number is provided within the RAM 403.

Figure 20A:
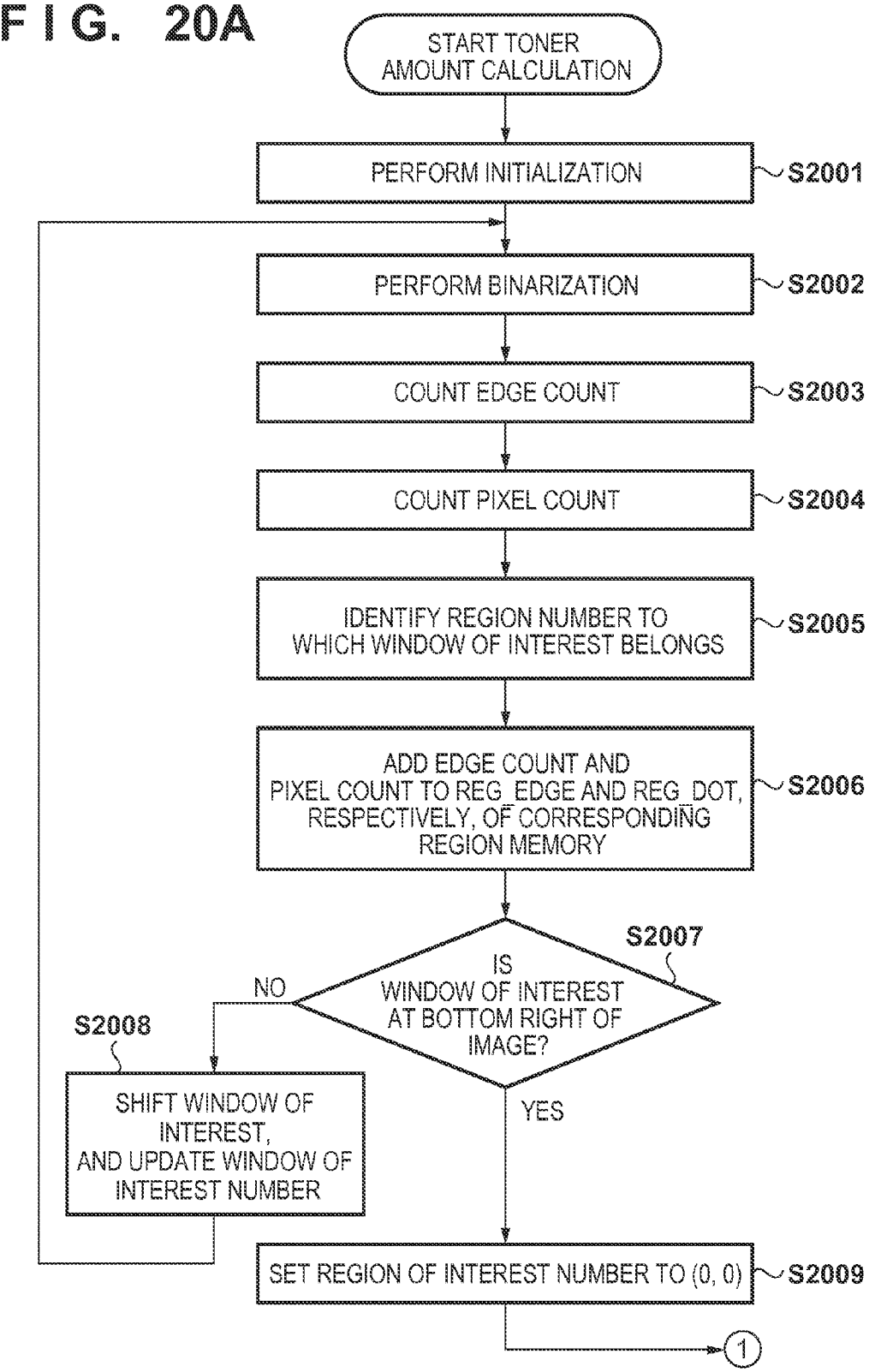
FIGS. 20A and 20B are flowcharts illustrating a flow of a toner amount calculation unit according to Embodiment 2.
Figure 20B:
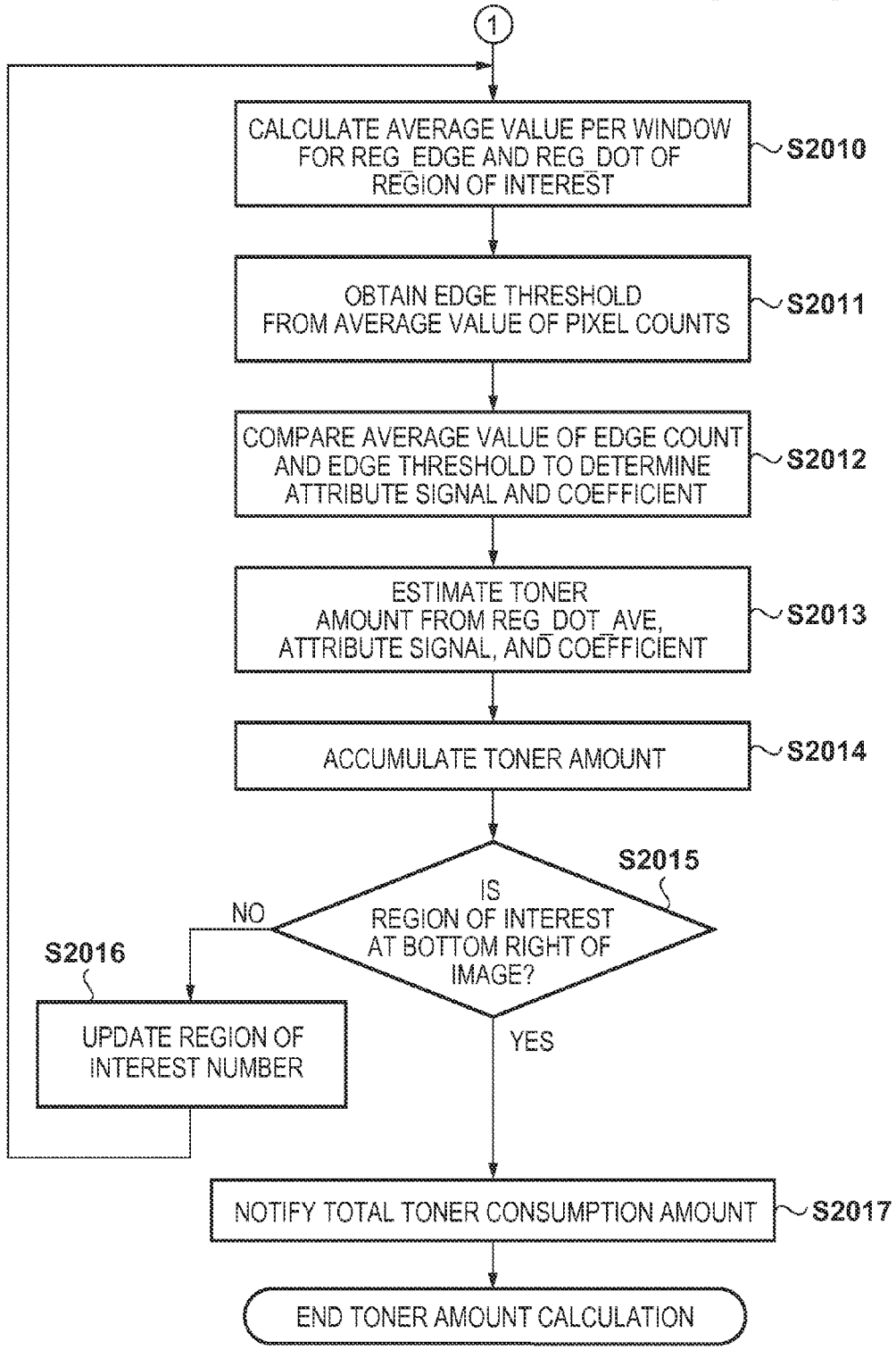

The flow of processing performed by the toner amount calculation unit 505 in the present embodiment will be described with reference to FIGS. 20A and 20B. At S2001, the toner amount accumulation unit 806 initializes the total toner amount Total_value within one page to 0, and initializes the edge count Reg_Edge and the pixel count Reg_Dot in the region memory to 0. In addition, the toner amount calculation unit 505 sets the window of interest to the window at the top left of the image, and sets the window of interest number to (0, 0). At S2002, the binarization unit 801 converts the image data within the window of interest into binary data by the same method as in Embodiment 1.

At S2003, the edge counter 802 counts the edge count for the image data that has been binarized by the same method as in Embodiment 1. At S2004, the pixel counter 803 counts the number of pixels having a pixel value of 1 for the binarized image data. At S2005, the toner amount calculation unit 505 identifies the region number to which the window of interest belongs. In accordance with the relationship between the region and the window shown in FIG. 19, if it is assumed that the window of interest number is (x, y), the corresponding region number is obtained as ([x/60], [y/3]). Here, [A/B] represents the quotient obtained by dividing A by B.

At S2006, the image determination unit 804 adds the edge count EdgeCount calculated by the edge counter 802 to the edge count Reg_Edge held within the region memory. The edge count Reg_Edge is managed in association with the region number of the region to which the window for which the edge count EdgeCount has been obtained belongs.

Likewise, the image determination unit 804 adds the pixel count DotCount calculated by the pixel counter 803 to the pixel count Reg_Dot held within the region memory. The pixel count Reg_Dot is managed in association with the region number of the region to which the window for which the pixel count DotCount has been obtained belongs.

At S2007, the toner amount calculation unit 505 determines whether the window of interest has reached the bottom right of the image. If the window of interest has not reached the bottom right of the image, the procedure proceeds to S2008. At S2008, the toner amount calculation unit 505 shifts the window of interest to the next window, and updates the window of interest number. The window is shifted in the order illustrated in FIG. 8. That is, in the case of shifting the window to the right, the window of interest number (x, y) is updated to (x+1, y). When the window of interest is located at the right end of the image and is shifted to the left end and one position down, the window of interest number (x, y) is updated to (0, y+1). Thereafter, the procedure moves to the processing at S2002 again. If the window of interest has reached the bottom right of the image at S2007, the procedure proceeds to S2009.

At S2009, the toner amount calculation unit 505 sets the region of interest number to (0, 0). At S2010, the toner amount calculation unit 505 divides the Reg_Edge of the region memory identified by the region of interest number by the number of windows (e.g., 180) constituting one region to calculate an average value Reg_Edge_ave of the edge count per window. Likewise, the toner amount calculation unit 505 divides the Reg_Dot of the region memory identified by the region of interest number by the number of windows (e.g., 180) constituting one region to calculate an average value Reg_Dot_ave of the pixel count per window.

Figure 21:
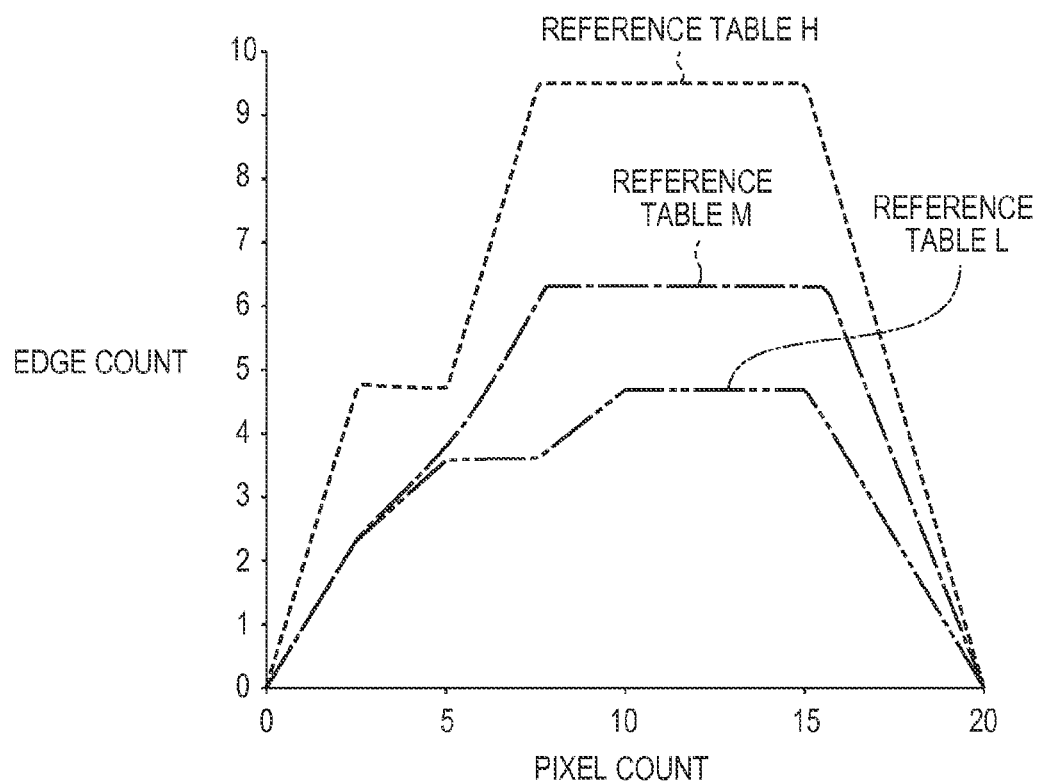
FIG. 21 is a diagram showing examples of a reference table according to Embodiment 2.

As shown by FIG. 21, the image determination unit 804 holds three reference tables (reference table H, reference table M, reference table L) that have been generated in advance for a window size of 20×1 by the same method as in Embodiment 1. At S2011, the image determination unit 804 replaces EdgeCount with Reg_Edge, and performs the same processing as the processing at step S905 in Embodiment 1. At S2012, the image determination unit 804 replaces DotCount with Reg_Dot, and performs the same processing as the processing at step S906 in Embodiment 1.

Figure 22:
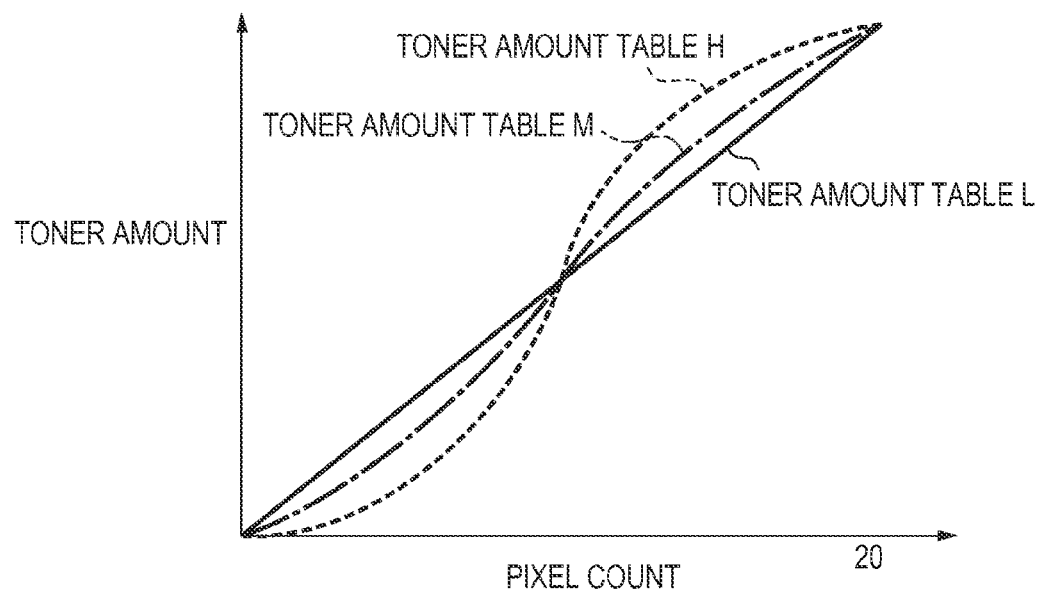
FIG. 22 is a diagram showing examples of a toner amount table according to Embodiment 2.

As shown by FIG. 22, the toner amount acquisition unit 805 includes three toner amount tables (toner amount table H, toner amount table M, toner amount table L) that have been generated for a window size of 20×1 by the same method as in Embodiment 1. At S2013, the image determination unit 804 calculates the toner amount by the same method as that used at step S907 in Embodiment 1. The toner amount toner_value calculated here is the toner amount per window within the region. At S2014, the toner amount accumulation unit 806 multiplies toner_value by the number of windows (=180) within the region to convert it into the toner amount within the region, and adds the toner amount to the total toner amount Total_value.

At S2015, the toner amount calculation unit 505 determines whether the region of interest has reached the region at the bottom right of the image. If the region of interest has not reached the region at the bottom right of the image, the procedure proceeds to S2016. At S2016, the toner amount calculation unit 505 updates the region of interest number. In the case of shifting the region to the right, the region of interest number (x, y) is updated to (x+1, y). When the region is located at the right end of the image and is shifted to the left end and one position down, the region of interest number (x, y) is updated to (0, y+1). Thereafter, the procedure moves to the processing at S2010 again. If it is determined at S2015 that the region of interest has reached the region at the bottom right of the image, the procedure proceeds to S2017. At S2017, the toner amount accumulation unit 806 notifies the total toner amount Total_value to the toner amount management unit 405. In the manner described above, the toner amount calculation unit 505 calculates the toner amount.

Effect of the Invention

Figure 23:
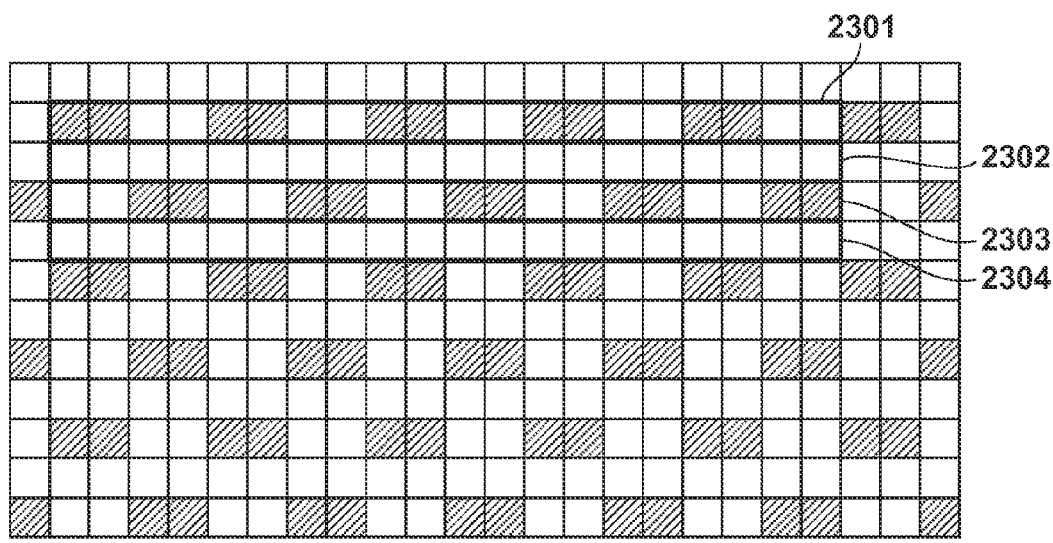
FIG. 23 is a diagram showing an effect of Embodiment 2.
Figure 24:
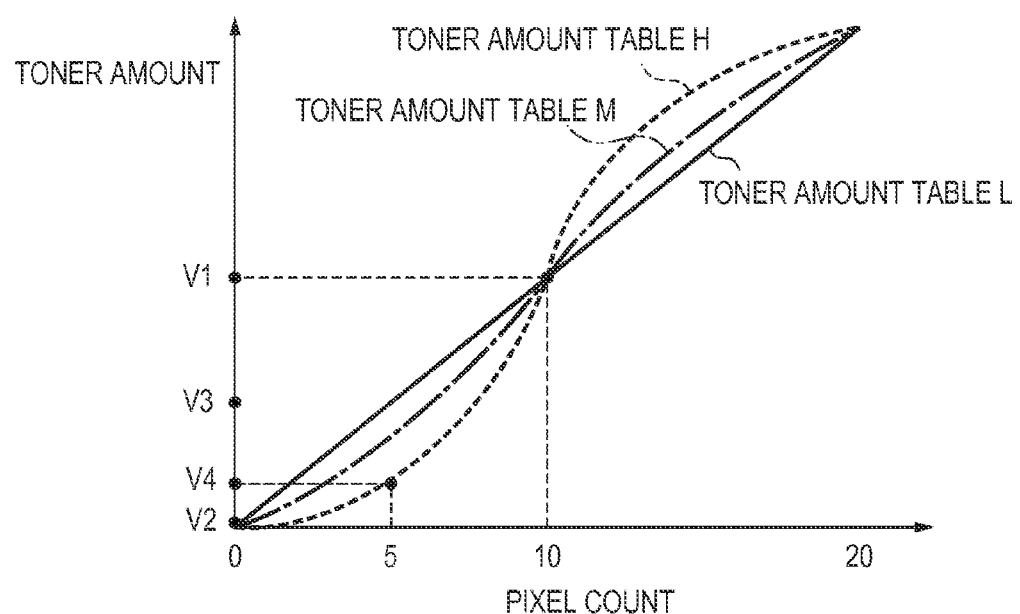
FIG. 24 is a diagram showing an effect of Embodiment 2.

A description will now be given of an effect of performing calculation in units of regions according to the present embodiment. FIG. 23 shows a state in which a window of 20×1 is overlapped with an image that has been subjected to 212-lpi halftone processing. The edge count EdgeCount within a window 2301 is 9, and the pixel count DotCount is 10. According to the reference tables shown in FIG. 21, the attribute of the window 2301 is P_H. Accordingly, the toner amount calculated from the toner amount table is V1 shown in FIG. 24. However, the edge count EdgeCount within a window 2302 that is shifted one position down is 0, and therefore, the pixel count DotCount is 0. The attribute of the window 2302 whose pixel count DotCount is 0 is P_H. Thus, the toner amount calculated from the toner amount table is V2 shown in FIG. 24. Similarly, the toner amount of a window 2303 is V1, and the toner amount of a window 2304 is V2. This state is repeated in an alternating manner. Accordingly, with the method in which the toner amount of each window is accumulated, the toner amount of the image as a whole is V3, which is an average value of the converted toner amounts V1 and V2 per window. However, since the image is actually an image having a screen ruling of 212 lpi and an area ratio of 25%, the correct toner amount as the converted toner amount per window is V4, which is the toner amount of the toner amount table H for a pixel count of 5. Therefore, in the case of a window size of 20×1, there is an error between the actual toner amount and the toner amount obtained by the method in which the toner amount of each window is accumulated.

In contrast, in the method according to the present embodiment, the edge count and the pixel count of each window are accumulated in units of regions, and then divided by the number of windows. Accordingly, the edge count for each region is 4.5, which is an average value of the edge counts of the windows 2301 and 2302. Similarly, the pixel count for each region is 5, which is an average value of the pixel counts of the windows 2301 and 2302. From the reference table shown in FIG. 21, the attribute can be identified as being P_H, and the toner amount calculated from the toner amount table is V4 shown in FIG. 24, and thereby, the correct toner amount is estimated. In the case of such a small window size, it is possible to accurately estimate the toner amount by a method in which the toner amount is calculated in units of regions as in the present embodiment. Note that the size of a region is not limited to those illustrated in the present embodiment, and a region size suitable for the product configuration of the image forming apparatus 102 may be selected.

Embodiment 3

Another embodiment of the present invention will now be described. Features common to embodiment 1 or embodiment 2 will not be described again herein, but combinations of those features and features of embodiment 3 necessary for the functioning of embodiment 3, as would be clear to a person skilled in the art, are considered to be disclosed with reference to embodiment 3 also. In the present embodiment, the number of vertical edges and the number of horizontal edges of an image are counted separately, and the estimate toner amount is corrected according to the ratio of the count values. The basic operation of the image forming apparatus 102 in the present embodiment is the same as that in Embodiment 1. Thus, the description of the common elements has been omitted, and only the difference will be described.

Operation of Toner Amount Calculation Unit

Figure 25:
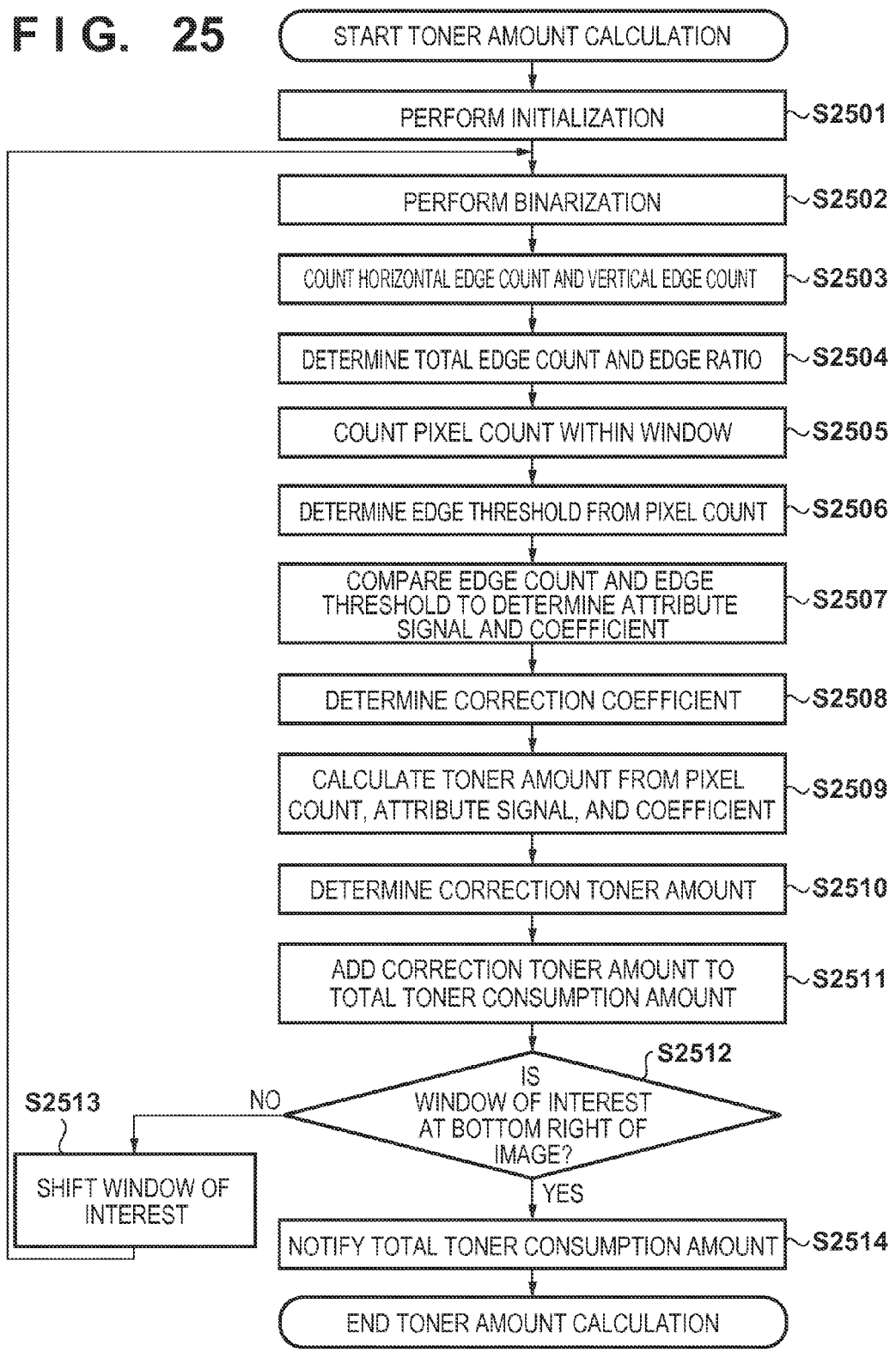
FIG. 25 is a flowchart illustrating a flow of processing performed by a toner amount calculation unit according to Embodiment 3.

The flow of processing performed by the toner amount calculation unit 505 in the present embodiment will be described with reference to FIG. 25. At S2501, the toner amount accumulation unit 806 performs initialization processing. Consequently, the total toner amount Total_value within one page is initialized to 0, and the window of interest is set to the window disposed at the top left of the image. At S2501, the binarization unit 801 converts the image data within the window of interest into binary data by the same method as in Embodiment 1.

At S2503, the edge counter 802 counts a horizontal edge count EdgeCount_H and a vertical edge count EdgeCount_V for the binarized image data. First, EdgeCount_H and EdgeCount_V are initialized to 0. The following processing is performed while the pixel of interest is being sequentially moved from the top left pixel to the bottom right pixel of the window. The method for shifting the pixel of interest is common to the method for shifting the window of interest and the region of interest. When the pixel value of the pixel of interest and the pixel value of the right pixel that is adjacent on the right to the pixel of interest are different, the edge counter 802 determines that the pixel of interest is a horizontal edge, and increases the edge count EdgeCount_H by one. When the pixel value of the pixel of interest and the pixel value of the lower pixel that is downwardly adjacent to the pixel of interest are different, the edge counter 802 determines that the pixel of interest is a vertical edge, and increases the edge count EdgeCount_V by one. For example, within the window illustrated in FIG. 11, the horizontal edge count EdgeCount_H is 19, and the vertical edge count EdgeCount_V is 19.

At S2504, the edge counter 802 adds EdgeCount_H and EdgeCount_V to calculate a total edge count EdgeCount, and calculates the ratio of the vertical edge count to the total edge count.

$$\text{edge ratio EdgeRate} = \text{EdgeCount\_V}/\text{EdgeCount}$$

If EdgeCount is 0, the edge counter 802 sets EdgeRate to 0.

At S2505, the pixel counter 803 counts the number of pixels (pixel count DotCount) having a pixel value of 1 for the binarized image data. The edge count EdgeCount and the edge ratio EdgeRate calculated by the edge counter 802 and the pixel count DotCount calculated by the pixel counter 803 are input to the image determination unit 804. The image determination unit 804 holds three reference tables (reference table H, reference table M, reference table L) that have been generated by the same method as in Embodiment 1.

At S2506, the image determination unit 804 acquires edge thresholds Edge_hi, Edge_mid, and Edge_low from the corresponding reference table H, reference table M, and reference table L based on DotCount by the same method as in Embodiment 1.

At S2507, the image determination unit 804 obtains the attribute signal and the coefficient ρ by the same method as in Embodiment 1. At S2508, the image determination unit 804 determines the correction coefficient Rev_Coef of the toner consumption amount based on DotCount and EdgeRate. The image determination unit 804 holds a correction coefficient table 2601 as shown in FIG. 26. In FIG. 26, the horizontal axis represents the pixel count and the vertical axis represents the correction coefficient. The image determination unit 804 obtains a correction amount Rev_Coef_Max (%) corresponding to DotCount from the correction coefficient table 2601. Next, the image determination unit 804 obtains a correction coefficient Rev_Coef based on the following equation.

$$\text{Rev\_Coef} = (\text{EdgeRate} - 0.5) \times 2 \times \text{Rev\_Coef\_Max}$$

The toner amount acquisition unit 805 includes three toner amount tables (toner amount table H, toner amount table M, toner amount table L) that have been generated by the same method as in Embodiment 1.

At S2509, the toner amount acquisition unit 805 calculates a toner amount toner_value by the same method as in step S907 of Embodiment 1. At S2510, the toner amount acquisition unit 805 corrects the toner amount toner_value based on the correction amount Rev_Coef_Max (%), and obtains a correction toner amount toner_value_rev.

$$\text{toner\_value\_rev} = \text{toner\_value} \times (100 + \text{Rev\_Coef\_Max})/100$$

At S2510, the toner amount accumulation unit 806 performs accumulation of the toner amount. For example, the toner amount accumulation unit 806 adds the correction toner amount toner_value_rev obtained by the toner amount acquisition unit 805 to the total toner amount Total_value. At S2511, the toner amount calculation unit 505 determines whether the window of interest has reached the bottom right window of the image. If the window of interest has not reached the bottom right window of the image, the procedure proceeds to S2513. At S2513, the toner amount calculation unit 505 shifts the window of interest to the next window, and the procedure moves to step S2502 again. If it is determined at step S2512 that the window of interest has reached the bottom right window of the image, the procedure proceeds to S2514. At S2514, the toner amount calculation unit 505 notifies the total toner amount Total_value to the toner amount management unit 405.

Description of Effect

With an electrophotographic image forming apparatus, "image having a large number of pixels that are consecutive in the horizontal direction" as illustrated in FIG. 27A and "image having a small number of pixels that are consecutive in the horizontal direction" as illustrated in FIG. 27B may have different toner amounts consumed even if they have the same pixel count. The reason for this will be described in the following. For "image having a large number of pixels that are consecutive in the horizontal direction", the time during which laser continuously emits light on the scanning line is long. Accordingly, the electrostatic latent image on the photosensitive drum tends to be formed deep and wide. On the other hand, for "image having a small number of pixels that are consecutive in the horizontal direction", the time between the start and the end of emission of light by the laser on the scanning line is very short. Accordingly, the laser cannot be sufficiently applied onto the photosensitive drum, and the electrostatic latent image on the photosensitive drum is formed shallow and narrow.

FIG. 27C is a cross-sectional view of an electrostatic latent image of the image shown in FIG. 27A, as viewed in the longitudinal direction. FIG. 27D is a cross-sectional view of an electrostatic latent image of the image shown in FIG. 27B, as viewed in the longitudinal direction. It can be seen that the electrostatic latent image of "image having a large number of pixels that are consecutive in the horizontal direction" is deeper and wider than that of "image having a small number of pixels that are consecutive in the horizontal direction". Accordingly, the amount of the toner adhering to the photosensitive drum during development is larger for "image having a large number of pixels that are consecutive in the horizontal direction" than for "image having a small number of pixels that are consecutive in the horizontal direction", and the toner consumption amount is also larger for the former.

With the method in which the type of the image is determined only from the edge count within the window, the edge counts of these two images are calculated to be equal, and the toner amounts are also the same. In contrast, in the present embodiment, the horizontal edge count and the vertical edge count are separately counted. As can be seen from FIGS. 27A and 27B, "image having a large number of pixels that are consecutive in the horizontal direction" has a larger vertical edge count, and "image having a small number of pixels that are consecutive in the horizontal direction" has a larger horizontal edge count. By making use of this, the toner amount acquisition unit 805 calculates the ratio of the vertical edge count to the total edge count, and makes a correction so as to increase the toner amount if the ratio of the vertical edge count is large, and makes a correction so as to decrease the toner amount if the ratio of the vertical edge count is small. This makes it possible to accurately estimate the toner amount according to the depth and the area of the electrostatic latent image. Note that although the correction amount is determined by the ratio of the vertical edge count to the total edge count in the present embodiment, the correction amount may be determined by referring to the attribute and the edge count of the image, in addition to this ratio.

CONCLUSION

As has been described thus far, in the present embodiment, the edge counter 802 counts the number of edges satisfying a predetermined edge condition. The pixel counter 803 counts the number of pixels satisfying a predetermined density condition (tone condition). The image determination unit 804 and the toner amount acquisition unit 805 function as the calculation units that calculate the toner consumption amount based on the edge count and the pixel count. Consequently, the toner consumption amount can be accurately obtained according to the type of the image.

Note that an image (image data) composed of a plurality of pixels may be logically divided into a plurality of areas. The edge counter 802 counts the number of edges satisfying the edge condition within each area of the plurality of areas. The pixel counter 803 counts the number of pixels satisfying the density condition (tone condition) within each area. The image determination unit 804 and the toner amount acquisition unit 805 obtain the toner consumption amount correlated with a spatial frequency or the depth and the area of an electrostatic latent image for each area based on the edge count and the pixel count. The toner amount accumulation unit 806 accumulates the toner consumption amount of each area to determine a total toner consumption amount. In this way, it may be noted that the spatial frequency or the depth and the area of the electrostatic latent image within each area constituting the image are correlated with the toner consumption amount. The spatial frequency or the depth of the electrostatic latent image can be known from the edge count and the pixel count that are counted for each area and satisfy a predetermined condition.

In the above-described embodiments, halftone processing is performed in the image forming apparatus 102. However, the image forming apparatus 102 may receive bitmap data that has been subjected to halftone processing in the host computer 101 or the like. In this case, the information about the attribute (e.g., screen ruling, character, photograph) of the image is of course unknown. However, advantageously, the present embodiment can accurately estimate the toner consumption amount from the edge count and the pixel count, without receiving such information. Although the above-described embodiments have been described, taking a case where the calculation of the toner consumption amount is performed by the video controller 1103, the present invention is not limited thereto. It is also possible that image information is sent to the printer engine 104 from the video controller 103, the edge count and the pixel count are obtained in the printer engine 104, and the calculation of the toner consumption amount is performed.

With the method disclosed in Japanese Patent Laid-Open No. 2012-48056, it is necessary to measure the number of consecutive pixels and the interval with the neighboring pixels for the input image data. In addition, the method disclosed in Japanese Patent Laid-Open No. 2012-48056 requires a large amount of memory in order to hold consumption patterns corresponding to various input image patterns (the number of consecutive pixels and the pixel interval) in advance. Moreover, the method disclosed in Japanese Patent Laid-Open No. 2012-48056 has a high processing load for recognizing image patterns, and high-speed processing will lead to an increase in the cost. On the other hand, according to the present invention, the toner consumption amount can be determined from the edge count and the pixel count, and thus, the computational load is light. In addition, it is possible to reduce the memory requirements by providing several conversion tables, and executing interpolation processing as needed.

Specifically, as described in relation to S905 to S907, the toner amount acquisition unit 805 selects the conversion table (toner amount table) for converting the pixel count into the toner consumption amount based on the edge count and the pixel count. The toner amount acquisition unit 805 converts the pixel count of each area into the toner consumption amount of the area by using the selected conversion table. By providing the conversion tables in advance in this way, it is possible to convert the pixel count into the toner consumption amount with a small computing amount.

As described with reference to S905 to S907, the toner amount acquisition unit 805 may occasionally select two conversion tables. The toner amount acquisition unit 805 may determine the toner consumption amount by correcting the toner consumption amount obtained from the two conversion tables by using the coefficient $\rho$ obtained from the edge count. This makes it possible to accurately estimate the toner amount.

As described in relation to S905, the image determination unit 804 may choose the reference table corresponding to a pixel count based on the pixel count, determine the edge threshold based on that reference table, and determine the attribute of each area according to a result of comparison between the edge count and the edge threshold. In this case, the toner amount acquisition unit 805 selects the conversion table according to the attribute determine by the image determination unit 804. The edge count and the pixel count are parameters indicating the spatial frequency or the depth and the area of the electrostatic latent image. Accordingly, it is possible to efficiently determine the type of the image by choosing the reference table for use based on the edge count and the pixel count.

As described in relation to Embodiment 1, one area may be constituted by one window. Alternatively, as described in relation to Embodiment 2, one area may be composed of a plurality of windows. The edge count of each area may be an average value of the edge counts determined for each of the plurality of windows constituting that area. In addition, the pixel count of each area may be an average value of the pixel counts determined for each of the plurality of windows constituting that area. Note that the window may be composed of N pixels (N is a natural number of 2 or more) of a plurality of pixels constituting one line of an input image in the main-scanning direction. In Embodiment 2, a case where N is 20 has been described as an example. In this case, the image memory can be configured by a line buffer, thus providing the advantage of reducing the memory capacity.

As described in relation to Embodiment 1, when the pixel value of the right pixel located adjacent on the right to the pixel of interest and the pixel value of the pixel of interest in each area are different, or the pixel value of the lower pixel located downwardly adjacent to the pixel of interest and the pixel value of the pixel of interest are different, the pixel of interest may be counted as an edge. Adopting such a predetermined condition enables an edge in the image to be accurately identified. Although in the foregoing, the right pixel located adjacent on the right to the pixel of interest and the lower pixel located downwardly adjacent to the pixel of interest are compared as an example, the present invention is not limited thereto. For example, the window may be moved starting from the bottom right. When the pixel value of a left pixel located adjacent on the left to the pixel of interest and the pixel value of the pixel of interest are different, or the pixel value of an upper pixel located upwardly adjacent to the pixel of interest and the pixel value of the pixel of interest are different, the pixel of interest may be counted as an edge. In this way, it is possible to start moving the window from any position and count edges.

As described in relation to Embodiment 3, when the pixel value of the right pixel located adjacent on the right to the pixel of interest and the pixel value of the pixel of interest are different in each area, the pixel of interest may be counted as a horizontal edge. Furthermore, when the pixel value of the lower pixel located downwardly adjacent to the pixel of interest and the pixel value of the pixel of interest are different, the pixel of interest may be counted as a vertical edge. The edge counter 802 may calculate the edge count of each area by adding the number of horizontal edges and the number of vertical edges.

The toner amount acquisition unit 805 may obtain the ratio between the total edge count obtained by adding the number of horizontal edges and the number of the vertical edges and the number of the vertical edges as the edge ratio. In this case, the toner amount acquisition unit 805 may obtain a correction amount for the toner consumption amount based on the pixel count and the edge ratio, and correct the toner consumption amount by adding the correction amount to the toner consumption amount. As described with reference to FIGS. 27A to 27D, the depth and the area of a latent image differ depending on the pixels that consume toner are consecutive in the horizontal direction (main-scanning direction) or consecutive in the vertical direction (sub-scanning direction). Accordingly, it is possible to more accurately reflect the depth and the area of the latent image on the toner consumption amount by obtaining the toner consumption amount from the number of horizontal edges and the number of the vertical edges, and further correcting the toner consumption amount according to the edge ratio.

Note that the binarization unit 801 may binarize the pixel value of each pixel in an input image signal. In this case, the edge counter 802 and the pixel counter 803 may perform counting based on the binarized pixel value. By binarizing the pixel value, it is possible to reduce the load on count processing.

Two adjacent areas in a plurality of areas may at least partially overlap, or two adjacent areas in the plurality of areas may not overlap. In particular, the former can be expected to improve the estimation accuracy of the toner consumption amount, and the latter can be expected to reduce the computing amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-018831, filed Feb. 3, 2014 which is hereby incorporated by reference wherein in its entirety.

What is claimed is:

1. An image forming apparatus for forming an image on a recording medium, comprising:
  a count unit configured to count, among a plurality of pixels in image data for forming the image, the number of pixels whose relationship with an adjacent pixel satisfies a predetermined edge condition to provide an edge count and to count the number of pixels having a density greater than or equal to a predetermined density to provide a pixel count;

a determination unit configured to determine information regarding a type of the image based on the edge count and the pixel count; and a calculation unit configured to calculate a toner consumption amount based on the determined information regarding the type of the image and the pixel count.

2. The image forming apparatus according to claim 1,
wherein the count unit is further configured to divide the plurality of pixels contained in the image data into a plurality of areas, and to perform the edge count and the pixel count for each area of the plurality of areas, and wherein the calculation unit is further configured to accumulate the toner consumption amount calculated for said each area based on the edge count and the pixel count that have been performed for said each area.

3. The image forming apparatus according to claim 2, wherein the toner consumption amount is a toner consumption amount correlated with a spatial frequency or a depth and an area of an electrostatic latent image.

4. The image forming apparatus according to claim 2, further comprising:
a selection unit configured to select a conversion table for converting the pixel count into a toner consumption amount based on the edge count and the pixel count.

5. The image forming apparatus according to claim 4, wherein, when the selection unit selects two conversion tables, and the calculation unit is configured calculate the toner consumption amount by correcting the toner consumption amount obtained from the two conversion tables by using a coefficient obtained from the edge count.

6. The image forming apparatus according to claim 4, wherein the selection unit is further configured to choose a reference table corresponding to the pixel count based on said pixel count, to determine an edge threshold based on the reference table, to determine an attribute of said each area according to a result of comparison between the edge count and the edge threshold, and to select the conversion table according to the attribute.

7. The image forming apparatus according to claim 2, wherein the areas are composed of a plurality of windows, the edge count of said each area is an average value of edge counts obtained for each of the plurality of windows constituting said each area, and a pixel count of said each area is an average value of pixel counts obtained for each of the plurality of windows constituting said each area.

8. The image forming apparatus according to claim 7, wherein the windows are each composed of N pixels, where N is a natural number of 2 or more, included in a plurality of pixels constituting one line of input image in a main-scanning direction.

9. The image forming apparatus according to claim 2, wherein two adjacent areas in the plurality of areas at least partially overlap.

10. The image forming apparatus according to claim 2, wherein two adjacent areas in the plurality of areas do not overlap.

11. The image forming apparatus according to claim 1, wherein, when a pixel value of a right pixel located adjacent on the right of a pixel of interest and a pixel value of the pixel of interest are different, or a pixel value of a lower pixel located downwardly adjacent to the pixel of interest and a pixel value of the pixel of interest are different, or a pixel value of a left pixel located adjacent on the left to the pixel of interest and a pixel value of the pixel of interest are different, or a pixel value of an upper pixel located upwardly adjacent to the pixel of interest and a pixel value of the pixel of interest are different, the count unit obtains the edge count by counting the pixel of interest as an edge.

12. The image forming apparatus according to claim 1, wherein, when a pixel value of a right pixel located adjacent on the right to a pixel of interest and a pixel value of the pixel of interest are different or a pixel value of a left pixel located adjacent on the left to the pixel of interest and a pixel value of the pixel of interest are different, the count unit counts the pixel of interest as a horizontal edge, and when a pixel value of a lower pixel located downwardly adjacent to the pixel of interest and a pixel value of the pixel of interest are different or a pixel value of an upper pixel located upwardly adjacent to the pixel of interest and a pixel value of the pixel of interest are different, the count unit counts the pixel of interest as a vertical edge, and obtains the edge count by adding the number of the horizontal edges and the number of the vertical edges.

13. The image forming apparatus according to claim 12, further comprising:
a correction unit configured to obtain a ratio between a total edge count obtained by adding the number of the horizontal edges and the number of the vertical edges and said number of the vertical edges as an edge ratio, to obtain a correction amount for the toner consumption amount based on the pixel count and the edge ratio, and to correct the toner consumption amount by adding the correction amount to the toner consumption amount.

14. A calculation method of a toner consumption amount, comprising:
counting, among a plurality of pixels in image data, the number of pixels whose relationship with an adjacent pixel satisfies a predetermined edge condition to provide an edge count and counting the number of pixels having a density greater than or equal to a predetermined density to provide a pixel count;

determining information regarding a type of the image based on the edge count and the pixel count; and calculating a toner consumption amount based on the determined information regarding the type of the image and the pixel count.

15. The method according to claim 14,
wherein the step of counting comprises dividing the plurality of pixels contained in the image data into a plurality of areas, and performing the edge count and the pixel count for each area of the plurality of areas, and the step of calculating comprises accumulating the toner consumption amount calculated for said each area based on the edge count and the pixel count that have been performed for said each area.

16. The method according to claim 15, further comprising:
selecting a conversion table for converting the pixel count into a toner consumption amount based on the edge count and the pixel count.

17. The method according to claim 14, wherein the counting step comprises obtaining the edge count by counting a pixel of interest as an edge, when a pixel value of a right pixel located adjacent on the right of the pixel of interest and a pixel value of the pixel of interest are different, or a pixel value of a lower pixel located downwardly adjacent to the pixel of interest and a pixel value of the pixel of interest are different, or a pixel value of a left pixel located adjacent on the left to the pixel of interest and a pixel value of the pixel of interest are different, or a pixel value of an upper pixel located upwardly adjacent to the pixel of interest and a pixel value of the pixel of interest are different.

18. The method according to claim 14, wherein the step of counting comprises:

counting a pixel of interest as a horizontal edge when a pixel value of a right pixel located adjacent on the right to the pixel of interest and a pixel value of the pixel of interest are different or a pixel value of a left pixel located adjacent on the left to the pixel of interest and a pixel value of the pixel of interest are different;

counting the pixel of interest as a vertical edge when a pixel value of a lower pixel located downwardly adjacent to the pixel of interest and a pixel value of the pixel of interest are different or a pixel value of an upper pixel located upwardly adjacent to the pixel of interest and a pixel value of the pixel of interest are different; and obtaining the edge count by adding the number of the horizontal edge and the number of the vertical edge.

19. The method according to claim 18, further comprising:

obtaining a ratio between a total edge count obtained by adding the number of the horizontal edge and the number of the vertical edge and said number of the vertical edge as an edge ratio;

obtaining a correction amount for the toner consumption amount based on the pixel count and the edge ratio; and correcting the toner consumption amount by adding the correction amount to the toner consumption amount.

20. A non-transitory computer-readable storage medium storing a computer program that, when executed by an image forming apparatus, causes the an image forming apparatus to perform a method comprising:

obtaining a ratio between a total edge count obtained by adding the number of the horizontal edges and the number of the vertical edges and said number of the vertical edges as an edge ratio;

obtaining a correction amount for the toner consumption amount based on a pixel count comprising the number of pixels having a density greater than or equal to a predetermined density and the edge ratio; and correcting the toner consumption amount by adding the correction amount to the toner consumption amount.

* * * * *